(12) United States Patent
Narumi et al.

(10) Patent No.: US 7,881,173 B2
(45) Date of Patent: Feb. 1, 2011

(54) OPTICAL INFORMATION RECORDING METHOD, OPTICAL INFORMATION RECORDING DEVICE AND OPTICAL INFORMATION RECORDING MEDIUM

(75) Inventors: Kenji Narumi, Osaka (JP); Kenichi Nishiuchi, Osaka (JP); Shigeaki Furukawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/846,439

(22) Filed: Jul. 29, 2010

(65) Prior Publication Data

US 2010/0309767 A1 Dec. 9, 2010

Related U.S. Application Data

(60) Continuation of application No. 11/973,740, filed on Oct. 10, 2007, which is a division of application No. 10/511,931, filed as application No. PCT/JP03/04874 on Apr. 17, 2003, now Pat. No. 7,760,596.

(30) Foreign Application Priority Data

Apr. 19, 2002 (JP) ............................. 2002-117247

(51) Int. Cl.
*G11B 7/00* (2006.01)
(52) U.S. Cl. .................................. 369/59.25; 369/47.53
(58) Field of Classification Search .............. 369/59.25, 369/47.53
See application file for complete search history.

(56) References Cited

U.S. PATENT DOCUMENTS 5,005,164 A 4/1991 Sakamoto et al.
5,347,505 A 9/1994 Moritsugu et al.
5,418,770 A 5/1995 Ide et al.
5,490,126 A 2/1996 Furumiya et al.
5,959,962 A 9/1999 Matsumaru et al.
6,101,159 A 8/2000 Shoji et al.
6,459,666 B1 10/2002 Yokoi (Continued)

FOREIGN PATENT DOCUMENTS

EP 0 957 475 11/1999

(Continued)

OTHER PUBLICATIONS

Standard ECMA-274, $2^{nd}$ Edition—Jun. 1999: "Data Interchange on 120mm Optical Disk using +RW Format-Capacity: 3,0 Gbytes and 6,0 Gbytes", ECMA Standardizing Information and Communication Systems, Jun. 1, 1999, pp. 35-39, XP002217338.

*Primary Examiner*—Van N Chow
(74) *Attorney, Agent, or Firm*—Hamre, Schumann, Mueller & Larson, P.C.

(57) ABSTRACT

The present invention provides an optical information recording apparatus and method capable of effectively determining appropriate recording parameters in a short time with favorable efficiency, when recording information onto an optical disk having different information recording conditions and information recording characteristics. An information recording condition or an information recording characteristic of an optical disk 1 is identified, and a recording pulse position is corrected at a correction accuracy according to the identifies information recording condition or information recording characteristic, such that a recording mark is formed in a predetermined position.

4 Claims, 13 Drawing Sheets

U.S. PATENT DOCUMENTS

| | | |
|---|---|---|
| 6,661,759 B1 | 12/2003 | Seo |
| 6,813,232 B1 | 11/2004 | Sunagawa et al. |
| 6,894,961 B1 | 5/2005 | Osakabe |
| 6,975,571 B1 | 12/2005 | Narumi et al. |
| 7,006,419 B2 | 2/2006 | Yokoi |
| 7,193,948 B2 | 3/2007 | Furukawa et al. |
| 2002/0067670 A1 | 6/2002 | Akiyama et al. |
| 2005/0163036 A1 | 7/2005 | Nishiuchi et al. |

FOREIGN PATENT DOCUMENTS

| | | |
|---|---|---|
| EP | 0 978 827 | 2/2000 |
| EP | 0986054 | 3/2000 |
| EP | 1128383 | 8/2001 |
| EP | 1 170 731 | 9/2002 |
| JP | 59-210543 | 11/1984 |
| JP | 5-234079 | 9/1993 |
| JP | 06-052547 | 2/1994 |
| JP | 7-287847 | 10/1995 |
| JP | 8-147743 | 6/1996 |
| JP | 2000-113458 | 4/2000 |
| JP | 00/57408 | 9/2000 |
| JP | 2001-184792 A | 7/2001 |
| WO | 02/29791 | 4/2002 |

OPTICAL INFORMATION RECORDING METHOD, OPTICAL INFORMATION RECORDING DEVICE AND OPTICAL INFORMATION RECORDING MEDIUM

CROSS-REFERENCE TO RELATED APPLICATIONS

This application is a Continuation of U.S. application Ser. No. 11/973,740, filed Oct. 10, 2007, which is a Divisional of application Ser. No. 10/511,931, filed Oct. 18, 2004, which is a U.S. National Stage of PCT/JP03/04874, filed Apr. 17, 2003, which applications are incorporated herein by reference.

TECHNICAL FIELD

The present invention relates to optical information recording media, such as optical disks, for optically recording and reproducing information, and information recording methods and information recording apparatuses that use the optical information recording media.

BACKGROUND ART

In recent years, optical disks, optical cards and optical tapes and the like have been proposed and developed as media for optically recording information. Of these, optical disks have come in for particular attention as media that are capable of recording and reproducing information, both in large volumes and at high density. A phase change-type optical disk is one type of rewritable optical disk. In order to obtain the desired thermal and optical characteristics in phase change-type optical disks, it is common to use a multi-layered film configuration in which layers such as dielectric layers and reflecting layers are added onto the recording layer. The recording layer that is used in the phase change-type optical disk is either amorphous or crystalline, depending on the heating and cooling conditions caused by the laser light, and is reversible between the amorphous and crystalline states. The optical indices (refractive index and attenuation co-efficient) of the recording layer differ between the amorphous and crystalline states. In the phase change-type optical disk, the two states are selectively formed on the recording film in response to an information signal, and the optical changes (changes in transmittance or reflectance) that occur as a result are utilized to record and reproduce the information signal.

In order to obtain the two states, the information signal is recorded by a method such as described below. A laser light (power level Pp) that is focused by the optical head is irradiated onto the recording film of the optical disk in pulses (known as recording pulses) to raise the temperature of the recording film. When the temperature exceeds the melting temperature, the recording film melts, and after the passage of the laser light, the melted portion rapidly cools to become an amorphous recording mark (also known as a mark). It should be noted that the power level Pp is known as the peak power. Furthermore, when the light, whose intensity is of a level that raises the temperature of the recording film to more than the crystallizing temperature and less than the melting temperature, is focused and emitted by a laser light (power level Pb, where Pb<Pp) the irradiated portion of the recording film is crystallized. It should be noted that the power level Pb is known as the bias power. Furthermore, the peak power and the bias power more generally are referred to as recording power.

In this manner, a recording pattern of recording marks, which are created from amorphous regions that correspond to the recording data signal, and non-mark portions (also known as "spaces"), which are made of crystalline regions, is formed on a track of the optical disk. Thus, an information signal can be reproduced, utilizing the difference in optical characteristics between the crystalline regions and the amorphous regions.

Furthermore in recent years, use of the mark edge recording method (also known as PWM recording) has increased, replacing the mark position recording method (also known as PPM recording). As opposed to mark position recording, in which information is only held in the position of the recording mark itself, in mark edge recording, information is held in both the forward and back end of the edge of the recording mark, and thus it is advantageous for increasing the recording line density.

In the case of mark edge recording, the recording pulse during recording of a long mark is divided into a sequence of a plurality of recording pulses (these are known as multi pulses), and a recording method is used in which the width of the front pulse (known as the front end pulse) is made larger than the width of the middle pulses or the width of the last pulse (known as the back end pulse). Considering the influence of excess heat that is transmitted from the front portion of the mark, this is in order to lessen the distortion of the recording mark shape, and to record a more accurate mark by reducing the heat applied to the recording film when recording the rear portion of the mark to less than that which is applied when recording the front portion of the mark.

Coincidentally, in the case of the mark edge recording method, differences in thermal characteristics of optical disks affect the shape of the recording mark itself, and the degree of thermal interference between recording marks. That is to say, even if recorded by the same recording pulse waveform, the shape of the recording mark that is formed will differ between disks. As a result, the edge of the recording mark may be offset from the ideal position, depending on the disk, and the quality of the signal that is reproduced may drop. Because of this, methods have been proposed with which a recording mark can be recorded at an ideal edge position by optimally correcting the recording power, front end pulse edge position or back end pulse edge position for any disk.

As a method for correcting the front end pulse edge position or the back end pulse edge position, a method has been proposed in which combinations of code lengths that correspond to recording marks (known as recording code lengths), and code lengths that correspond to spaces before or after the recording marks (known respectively as pre-code length and post-code length) are provided in a correction table, and the front end pulse edge position and the back end pulse edge position are corrected according to correction values for the combinations in the correction table (known as correction table elements).

Furthermore, as a test recording method for correcting the front end pulse edge position and the back end pulse edge position, a method that corrects the front end pulse edge position or the back end pulse edge position has been disclosed in which before recording an actual information signal, a test pattern that has a specific period (known as a test pattern) is recorded, after which the test signal that was recorded is reproduced, and the front end pulse edge position and back end pulse edge position are corrected according to the amount of offset of the recording mark edge determined by measuring the reproduced signal.

It should be noted that the conventional methods described above are disclosed in, for example, Patent Document 1 given below.

Patent Document 1: WO 00/57408.

However, in the conventional methods described above, the correction table for optical disks that have different recording characteristics and recording conditions is always determined via a succession of identical test recording steps. Thus, if, for example, the thermal interference of an optical disk is small, and it is not necessary to correct the front end pulse edge position and the back end pulse edge position for each element of the correction table in order to obtain sufficient reproduction signal quality, then by going through what is effectively an unnecessary test recording step, the result is that there is a problem in that excessive time is taken for the recording and reproduction apparatus to come to a state in which it is actually capable of recording an information signal.

DISCLOSURE OF INVENTION

In order to solve the foregoing conventional problems, it is an object of the present invention to provide an optical information recording method and apparatus that is capable of effectively determining appropriate recording parameters in a short time, and accurately recording and reproducing information, when recording information onto a recording medium having different information recording conditions and information recording characteristics.

In order to achieve this object, the optical information recording method of the present invention is an optical information recording method that records information onto an optical information recording medium, the method provides an identification step of identifying an information recording condition or an information recording characteristic of the optical information recording media, and a recording pulse correction step of correcting a recording pulse position, in order to form a recording mark in a predetermined position, wherein in the recording pulse correction step, correction accuracy of the recording pulse position is changed depending on the information recording conditions or information recording characteristic that were identified in the identification step.

The recording process of the mark can be either a mark position recording process, or a mark edge recording process. Correction of the recording pulse position can mean either correction of the edge position of the recording pulse, or it can mean correction of the position of the recording pulse itself. Information recording condition means, for example, recording density or linear recording velocity, or the like, but is not limited to these. Furthermore, information recording characteristic means, for example, favorability of recording characteristic, and more specifically, means for example jitter or bit rate of the reproduction signal, or repetition of the recording and reproduction characteristic, however it is not limited to these.

According to the foregoing method, since the correction accuracy of the recording pulse position is changed according to the information recording condition or information recording characteristic of the optical information recording medium, it is capable of effectively determining recording parameters in a short time, and can accurately record and reproduce information.

It is also preferable that the optical information recording method of the present invention, in which an optical information recording medium that has two or more information layers is used as the optical information recording medium, further provides, before the identification step, an information layer specification step of specifying an information layer on which the information is to be recorded in the optical information recording medium, wherein in the identification step, information recording conditions or information recording characteristics of the information layer that is specified by the information layer specification step are identified, and wherein in the recording pulse correction step, the correction accuracy of a recording pulse position in order to record the information on the information layer that is specified in the information layer specification step is differentiated according to the information recording conditions or information recording characteristics that are identified in the identification step.

According to this method, the correction accuracy of the recording pulse position is changed according to differences in the recording conditions or recording characteristics of the information layers, and thus is capable of effectively determining appropriate recording parameters in a short time, and accurately recording and reproducing information.

Furthermore, in the optical information recording method according to the present invention, in which an optical information medium that has a test recording region is used as the optical information recording medium, it is preferable that the method further provides a test recording step of recording a pattern for test recording in the test recording region, using the recording pulse that was corrected in the recording pulse correction step, and a correction amount determination step of reproducing the pattern for test recording from the test recording region, and of determining the correction amount of the recording pulse position depending on the reproduction result.

Accordingly, the correction accuracy of the recording pulse position for forming the pattern for test recording is changed in accordance with differences in the recording conditions or recording characteristics of the optical information recording medium or information layers, and thus is capable of efficiently test recording in a short time to determine appropriate recording parameters, and can accurately record and reproduce information. Furthermore, in the optical information recording method of the present invention, in which an optical information recording medium that contains a control track region is used as the optical information recording medium, the identification step further comprises an identifier detection step that reproduces information from the control track region and detects an identifier that represents the information recording conditions or information recording characteristics of the optical information recording medium, from the information that is reproduced, wherein in the recording pulse correction step, the correction accuracy of the recording pulse position is differentiated according to the information recording conditions or information recording characteristics that are represented by the identifier detected in the identifier detection step.

According to this method, by differentiating the correction accuracy according to the identifier that is recorded on the optical information recording medium, the time required for determining the recording parameter can be shortened, and it is possible to record and reproduce information accurately. It should be noted that the identifier is not limited to representing the information recording condition or the information recording characteristic directly, but also can represent these indirectly.

Furthermore, in the optical information recording method of the present invention, in which an optical information recording medium that contains a test recording region is used as the optical information recording medium, it is also preferable that the identification step further provides a test recording step of recording a test recording pattern onto the test recording region, and a characteristic assessment step of reproducing the test recording pattern from the test recording region and of assessing the information recording characteristics of the optical information recording medium by measuring the jitter or the bit error rate of the reproduction signal, wherein in the recording pulse correction step, the correction accuracy of the recording pulse position is differentiated according to the information recording characteristics that are assessed in the characteristic assessment step.

According to this method, even when the optical information recording medium does not contain an identifier, by differentiating the correction accuracy in accordance with the results of the test recording, the time required for determining the recording parameter can be shortened, and it is possible to record and reproduce information accurately. Furthermore, in this case it is also possible to test record the pattern for test recording at a low correction accuracy, and increase the correction accuracy by, for example, increasing the number of table elements only when the jitter or the bitter error rate of the reproduction signal is higher than a fixed value, or conversely, it is possible to test record the pattern for test recording at a high accuracy, and decrease the correction accuracy by, for example, decreasing the number of table elements only when the jitter or the bit error rate of the reproduction signal is lower than a fixed value.

Furthermore, in order to achieve the object of the present invention, the optical information recording apparatus of the present invention is an optical information recording apparatus that records information onto an optical information recording medium, that provides identification means for identifying information recording conditions or information recording characteristics of the optical information recording medium, and recording pulse correction means for correcting a recording pulse position, in order to form a recording mark in a predetermined position, wherein the recording pulse correction means differentiates the correction accuracy of the recording pulse position according to the information recording conditions or the information recording characteristics that are identified by the identification means.

According to this apparatus, the correction accuracy of the recording pulse position is differentiated according to an information recording condition or information recording characteristic of the optical information recording medium, and thus is capable of efficiently deciding appropriate recording parameters in a short time and can record and reproduce information accurately.

Furthermore, in the optical information recording apparatus of the present invention, in which an optical information recording medium that has two or more information layers is used as the optical information recording medium, it is also possible further to provide information layer specification means for specifying the information layer in the optical information recording medium on which information is to be recorded, wherein the identification means identifies information recording conditions or information recording characteristics of the information layer that is specified by the information layer specification means, and wherein the recording pulse correction means differentiates the correction accuracy of the recording pulse position in order to record information into the information layer that is specified by the information layer specification means, according to the information recording conditions or information recording characteristics that are identified by the identification means.

According to this configuration, since the correction accuracy of the recording pulse position is differentiated in accordance with differences in the recording conditions and recording characteristics of the information layers, the apparatus is capable of effectively determining appropriate recording parameters in a short time, and accurately recording and reproducing information.

In the optical information recording apparatus of the present invention in which an optical information recording medium that contains a control track region is used as the optical information recording medium, the identification means further provides identifier detection means for reproducing information from the control track region, and for detecting an identifier that represents the information recording conditions or information recording characteristics of the optical information recording medium, from the information that is reproduced, wherein the recording pulse correction means differentiates the correction accuracy of the recording pulse position depending on the information recording conditions or information recording characteristics that are represented by the identifier detected by the identifier detection means.

According to this configuration, by differentiating the correction accuracy according to the identifier that is recorded on the optical information recording medium, the time required to determine the recording parameters can be shortened, and it is possible to record and reproduce information accurately.

In the optical information recording apparatus of the present invention, in which an optical information recording medium that contains a test recording region is used as the optical information recording medium, the identification means further provides test recording means for recording a pattern onto the test recording region, and characteristic assessment means for reproducing the test recording pattern from the test recording region and assessing the information recording characteristics of the optical information recording medium by measuring the jitter or the bit error rate of the reproduction signal, wherein the recording pulse correction means differentiates the correction accuracy of the recording pulse position according to the information recording characteristics that are assessed by the characteristic assessment means.

According to this configuration, even when the optical information recording medium does not contain an identifier, by differentiating the correction accuracy in accordance with the results of the test recording, the time required for determining the recording parameter can be shortened, and it is possible to record and reproduce information accurately. Furthermore, in this case it is also possible to test record the pattern for test recording at a low correction accuracy, and increase the correction accuracy by, for example, increasing the number of table elements only when the jitter or the bitter error rate of the reproduction signal is higher than a fixed value, or conversely, it is possible to test record the pattern for test recording at a high accuracy, and decrease the correction accuracy by, for example, decreasing the number of table elements only when the jitter or the bit error rate of the reproduction signal is lower than a fixed value.

Furthermore, in order to achieve the object of the present invention, the optical information recording medium of the present invention is an optical information recording medium that records information, wherein the optical information recording medium contains a plurality of correction tables whose correction accuracy is mutually different and that correspond to a plurality of information recording conditions or information recording characteristics.

According to this medium, since test recording is performed by directly changing the correction accuracy of the correction table according to the result read out from the correction table on the medium, the time required to determine the recording parameters can be shortened further, and information can be recorded and reproduced accurately.

It is also preferable that the foregoing optical information recording medium contains an identifier that represents the correction accuracy of a recording pulse position.

According to this medium, since it is possible to test record by changing the correction accuracy of the correction table according to the identification result of the identifier of the medium, the time required to determine the recording parameters can be shortened, and information can be recorded and reproduced accurately.

BEST MODE FOR CARRYING OUT THE INVENTION

Embodiments of the present invention are described below with reference to the drawings. The essence of the present invention is to cause a change in a correction accuracy of the recording pulse position, in response to various conditions such as recording characteristics and recording conditions of a disk, in order to form a recording mark in a predetermined position. As described below, the correction accuracy includes, for example, the number of elements in the correction table and the resolution of the correction table, however it is not limited to this.

Embodiment 1

Figure 1:
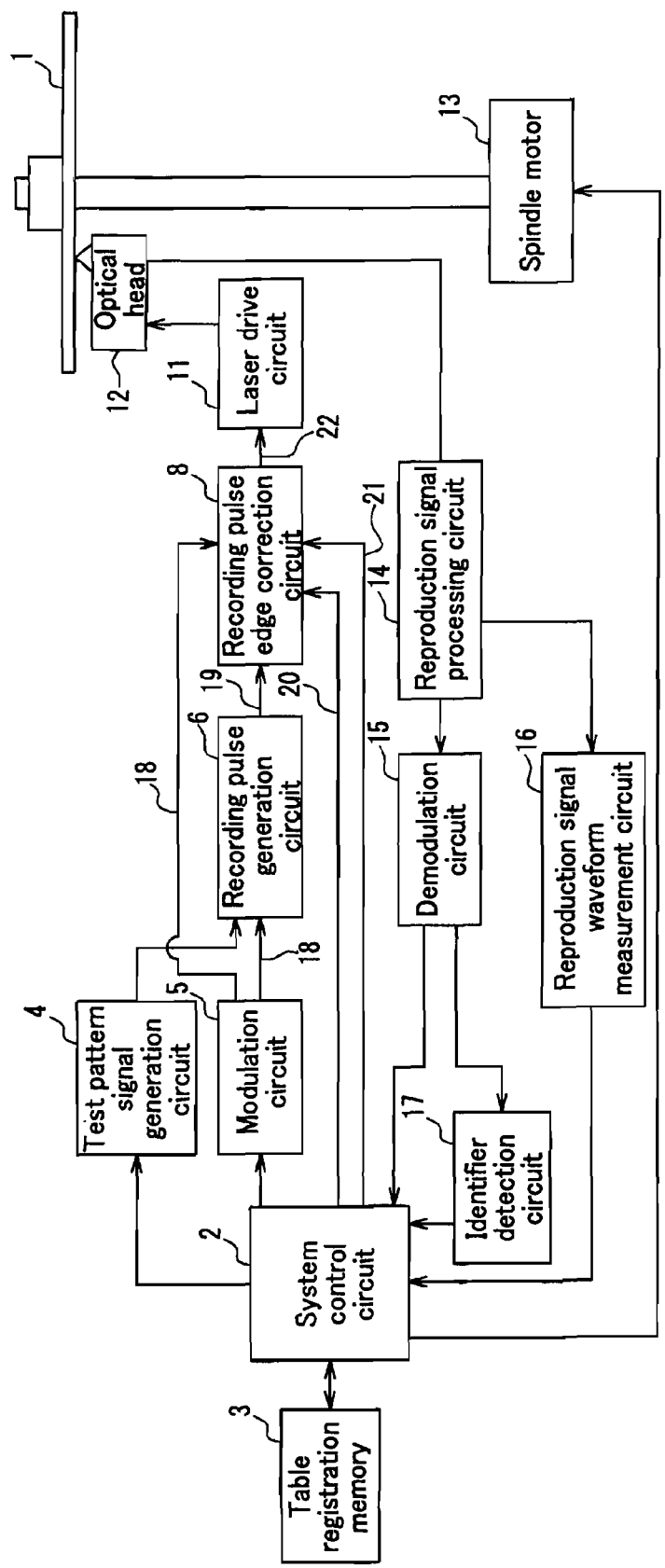
FIG. 1 is a block diagram showing a configuration of a recording and reproduction apparatus according to Embodiment 1 of the present invention.
Figure 2:
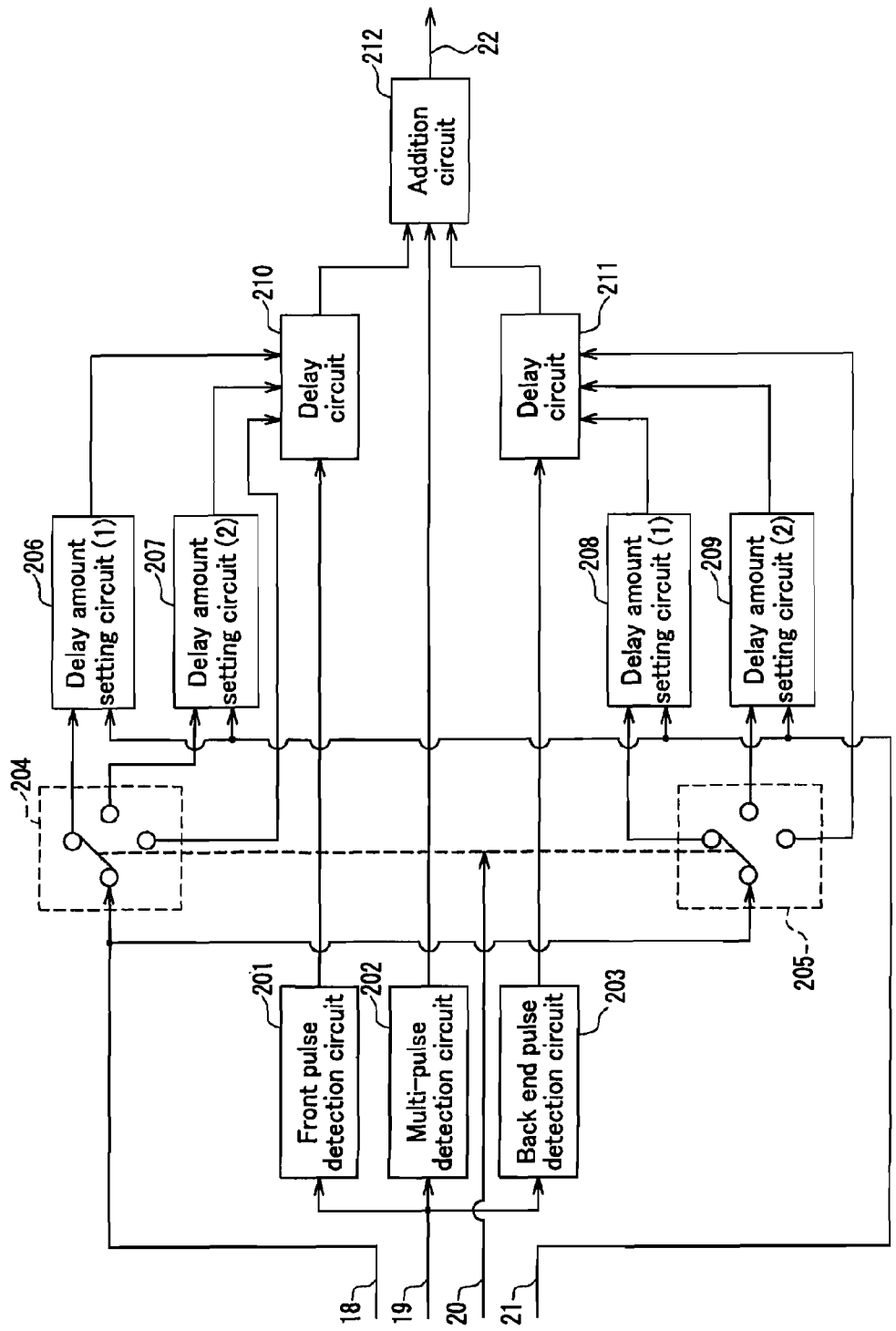
FIG. 2 is a block diagram showing a configuration of a recording pulse edge correction portion of the recording and reproduction apparatus according to Embodiment 1.

In the present embodiment, identifiers representing a recording density of a disk are assessed by reproducing the disk, and disks whose recording density is low are recorded using a correction table that has fewer elements. Thus, there is an advantage in not going through unnecessary test recording steps. In the present embodiment, an example is shown in which the number of elements of a correction table is differentiated for three types of recording density, namely a first, a second and a third recording density. The relationship between the recording densities is: (first recording density)>(second recording density)>(third recording density). FIG. 1 and FIG. 2 are block diagrams showing a conceptual structure of a recording and reproduction apparatus (optical information recording device) for realizing Embodiment 1.

The present recording and reproduction apparatus is an apparatus that records and reproduces information using an optical disk (optical information recording medium) 1, and is provided with a spindle motor 13 for rotating the optical disk 1 and an optical head 12 that contains a laser light source (not shown) that focuses laser light onto a desired location of the optical disk 1. The operation of the entire recording and reproduction apparatus is controlled by a system control circuit 2. The recording and reproduction apparatus of the present embodiment further includes a table registration memory 3 that registers the information in the correction table into each element. It should be noted that information in the correction table can be registered in the table registration memory 3 by read-out from the optical disk 1, or it can be recorded in the table registration memory 3 in advance, such as when the recording and reproduction apparatus is manufactured. It should be noted that in FIG. 1, a configuration is illustrated in which the table registration memory 3 is external to the system control circuit 2, however it is also possible to have a configuration in which the table registration memory 3 is provided inside the system control circuit 2.

The recording and reproduction apparatus is provided with a test pattern signal generation circuit 4 as recording data signal generating means. In order to determine the front end pulse edge position and the back end pulse edge position, the test pattern signal generation circuit 4 generates a test pattern signal for determining the edge position of the recording pulse that has a specific period, or generates a random pattern signal for generating a random pattern. Furthermore, the recording and reproduction apparatus contains a modulation circuit 5 as a recording data signal generating means that generates a recording data signal 18, which corresponds to a recorded information signal.

The recording and reproduction apparatus further is provided with a recording pulse generation circuit 6 that generates a recording pulse signal 19 for driving the laser, and a recording pulse edge correction circuit 8 that adjusts the front end pulse edge position and the back end pulse edge position of the recording pulse signal 19 that is output by the recording pulse generation circuit 6.

A laser drive circuit 11 further is provided in order to modulate an electric current that drives the laser light source in an optical head 12, in response to the recording pulse signal 22 that is output by the recording pulse edge correction circuit 8.

Furthermore, the recording and reproduction apparatus contains a reproduction signal processing circuit 14 that performs wave form processing of the reproduction signal, such as wave form equalization or binary conversion that is based on light reflected from the optical disk 1, as reproduction means for reproducing information from the optical disk 1, a reproduction signal waveform measuring circuit 16 that measures the reproduction signal waveform and detects the timing of the edge of the reproduction signal waveform, a demodulation circuit 15 that obtains reproduction information, and an identifier detection circuit 17 that obtains information about the optical disk 1 from the identifier contained on the optical disk 1.

FIG. 2 is a structural diagram showing of the recording pulse edge correction circuit 8 of FIG. 1 in further detail. The recording pulse edge correction circuit 8 contains a front pulse detection circuit 201 that detects a front pulse from the recording pulse signal, a multi pulse detection circuit 202 that detects a multi pulse, and a rear end pulse detection circuit 203 that detects a back end pulse. The recording pulse edge correction circuit 8 also is provided with selection circuits 204 and 205 for switching the number of elements in the correction table, first delay amount setting circuits 206 and 208 that set the amount of delay of the recording pulse edge for 32 elements, second delay amount setting circuits 207 and 209 that set the amount of delay of the recording pulse edge for eight elements, delay circuits 210 and 211 that finally adjust the recording pulse edge and an addition circuit 212 that adds the signal waveforms of the front pulse, the multi pulse and the back end pulse.

Figure 3:
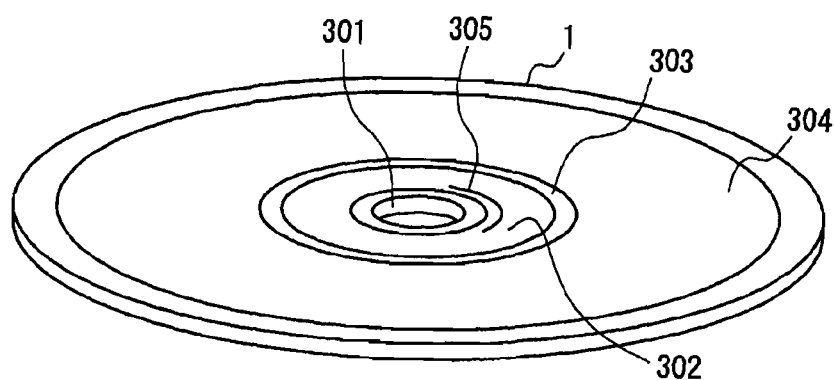
FIG. 3 is a perspective view showing a configuration of an optical information recording medium according to Embodiment 1.

FIG. 3 shows a perspective of the optical disk 1 (optical information recording medium) used in the present embodiment. The optical disk 1 has a substrate in which grooves or phase pits are formed in advance, and is fabricated by film forming such films as a dielectric film, a recording film and a reflecting film (all of which are omitted from the diagram). Moreover, the substrate (also called a cover substrate) can be bonded to the disk after film formation.

For the substrate, a transparent flat plate made of glass or resin or the like may be used. A material in which a resin is dissolved and then coated and dried also can be used.

As the dielectric film, it is possible to use an oxide such as $SiO_2$, SiO, $TiO_2$, MgO and $GeO_2$, a nitride such as $Si_3N_4$, BN, and MN, a sulfide such as ZnS and PbS, or a mixture of these.

Material whose phase changes between amorphous and crystalline can be used as the material for the recording film, for a example SbTh-based, InTe-based, GeThSn-based, SbSe-based, ThSeSb-based, SnThSe-based, InSe-based, ThGeSnO-based, ThGeSnAu-based, ThGeSnSb-based or TeGeSb-based chalcogen compound. Materials such as a Te-$ThO_2$-based, Te-$TeO_2$-Au-based and Te-$TeO_2$-Pd-based oxide can also be used. In the case of these materials, a phase change occurs between the crystalline (that is, corresponding to condition a) and amorphous (that is, corresponding to condition b) states. Furthermore, these also may be AgZn-based or InSb-based metallic compounds whose phase changes between the crystalline state (condition a) and the crystalline state (condition b).

Metallic materials such as Au, Ag, Al and Cu, or a multi-layer dielectric film that has high reflectance at a predetermined wavelength can be used as the reflective film.

As a method for film forming these materials, methods such as vacuum deposition or sputtering can be used.

Furthermore, the optical disk 1 contains a center hole 301 for fixing the optical disk 1 to a shaft of the spindle motor 13. The optical disk 1 also contains a control track region 302, a test recording region 303 and a data region 304 as its physical format.

The control track region 302 is a region for applying information that relates to the optical disk 1 to the optical information recording and reproduction apparatus, and it is principally reproduced when the optical disk 1 is inserted into the apparatus. The recording structure of the information in the control track region 302 can be a structure formed in advance as phase pits in the substrate, or it can be a structure recorded as an optical transformation in the recording layer.

The control track region 302 is for applying information that relates to the optical disk 1 with respect to the optical information recording and reproduction apparatus, and is principally replayed by the optical information recording and reproduction apparatus when the disk is inserted. The recording structure of the information recorded onto the control track region 302 can be a structure formed in advance on the substrate as a phase pit, and the structure can be recorded as an optical change in the recording film. Information representing, for example, the type of disk (such as single recordable, rewritable or rewritable only in a specific region), the size of the disk, recording density, recording power, information about the disk manufacturer and the correction table is recorded in the control track region 302.

An identifier 305 is recorded in the control track region 302. An identifier that corresponds to the correction accuracy is recorded as the identifier 305. In this identifier, the disk manufacturer can, based on a test result and prior to shipping, record information that represents the number of elements in the correction table by which sufficiently favorable recording and reproduction characteristics can be obtained in the optical disk 1. In the present embodiment, information that represents the recording density of the disk is used as the identifier. In a similar manner to the information recorded in the control track 302, the recording structure of the identifier 305 can be in the form of a phase pit, or it can be in the form of an optical transformation in the recording film. Furthermore, it is preferable that the identifier 305 is in the control track region 302, so that the apparatus can replay that information at the same time as other disk information when the disk is inserted. However it also can be in any other region on the optical disk 1.

The test recording region 303 is a region for test writing, which allows the optical information recording and reproduction apparatus to record onto the optical disk 1 at an appropriate recording power or recording pulse edge position. The data region 304 is the region for recording the actual information signal.

Operation of Embodiment 1

Figure 4:
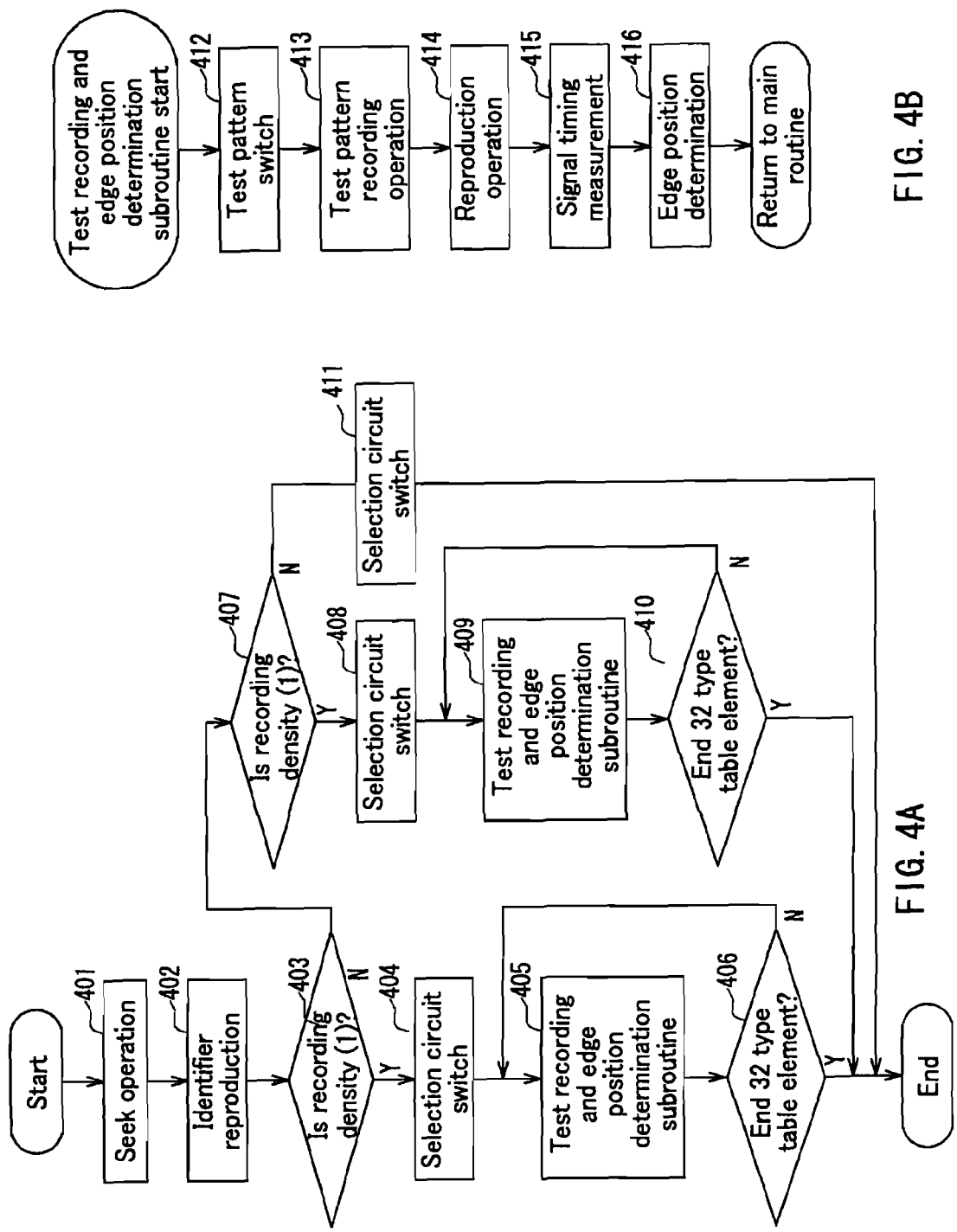
FIG. 4 is a flowchart that describes the operation of the recording and reproduction apparatus according to Embodiment 1.
Figure 5:
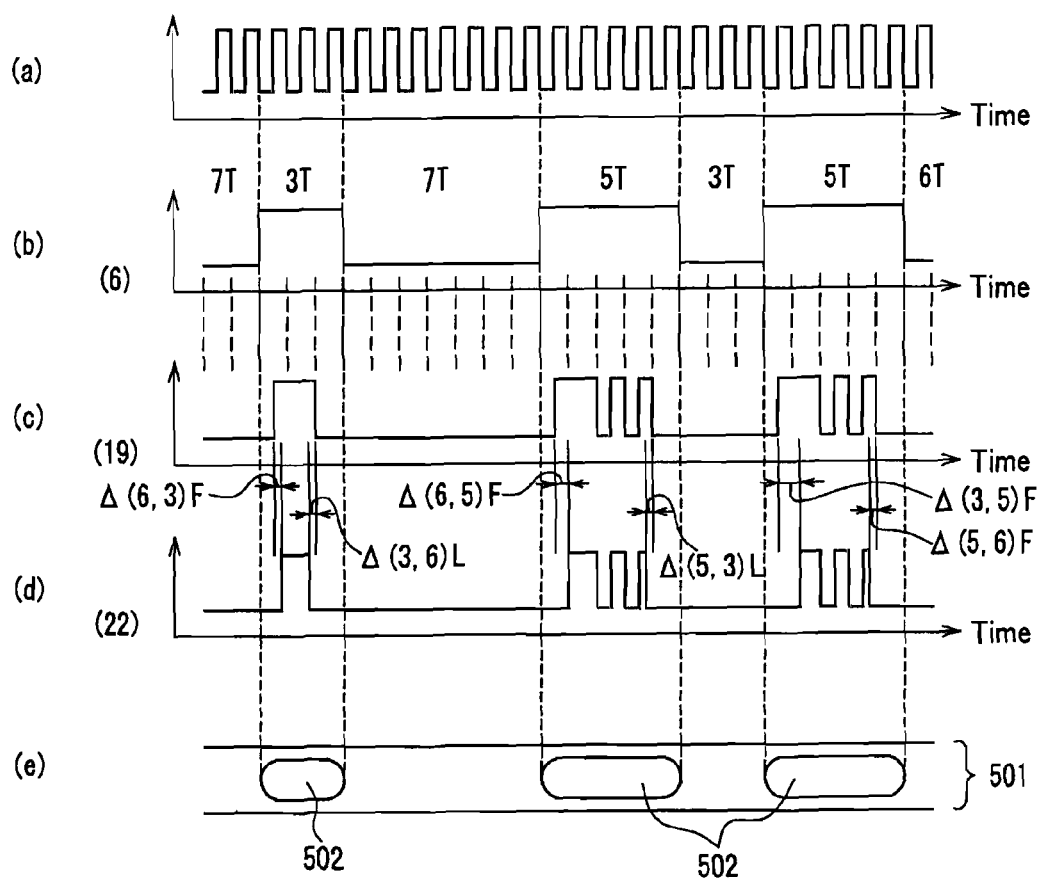
FIG. 5 is an explanatory diagram showing an example in which a recording pulse edge position is corrected, in Embodiment 1 and Embodiment 2 of the present invention.
Figure 6:
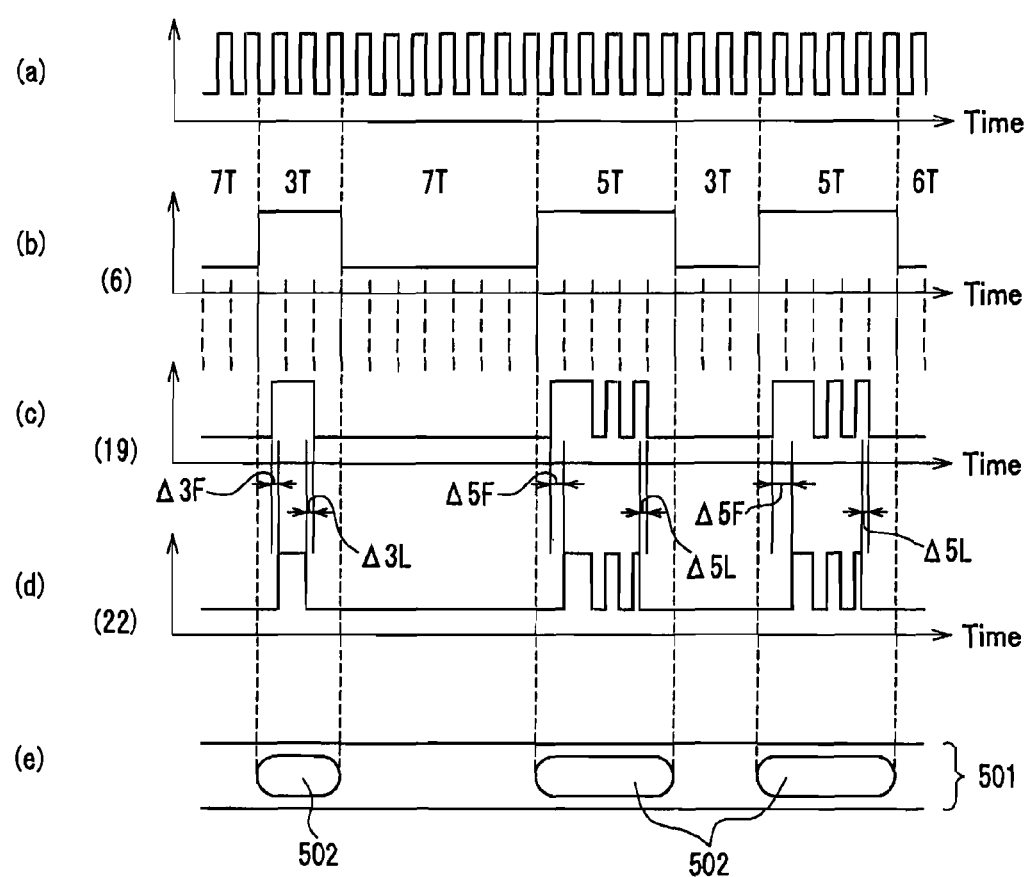
FIG. 6 is an explanatory diagram showing an example in which the recording pulse edge position is corrected in Embodiment 1 and Embodiment 2.
Figure 7:
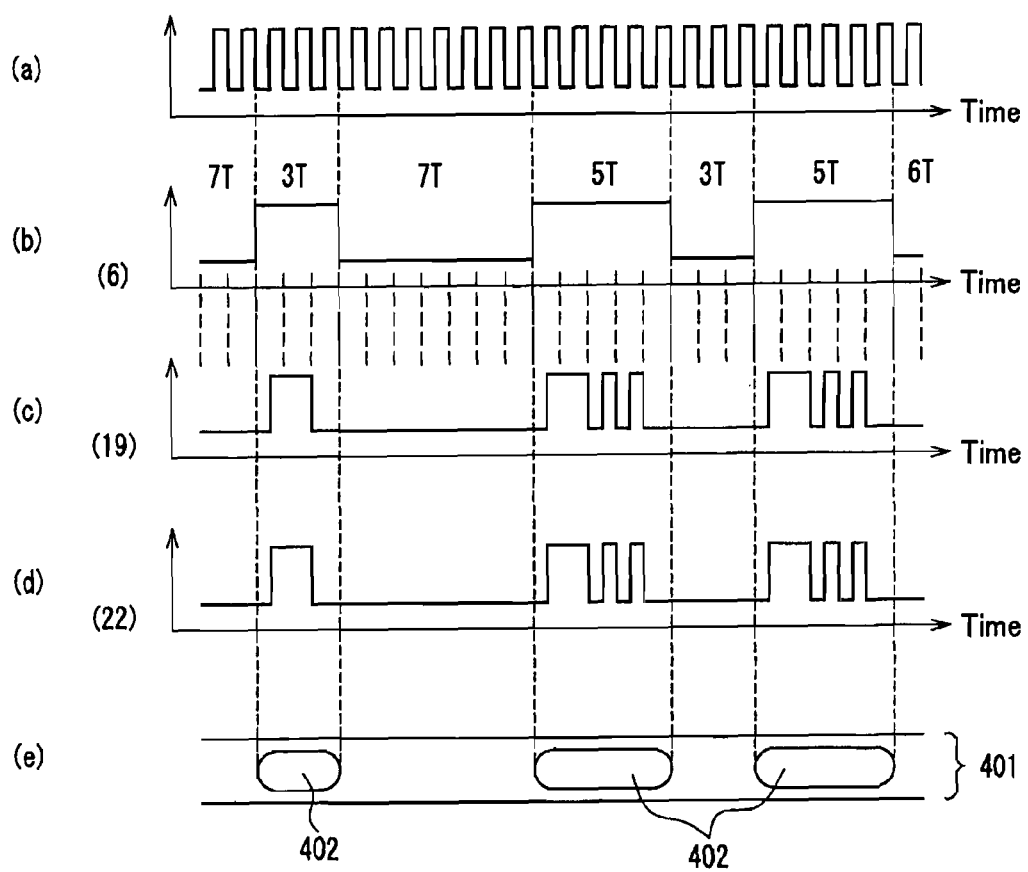
FIG. 7 is an explanatory diagram showing an example in which the recording pulse edge position is corrected in Embodiment 1.

The following is a description of the operation of the recording and reproduction device of the present embodiment using the flowchart in FIG. 4 and operational charts in FIG. 5 to FIG. 7.

FIG. 4 is a flowchart showing the operation of the present embodiment. FIG. 5 is a waveform showing the operation according to the present embodiment when recording at an increased recording density. The operation to correct the edge positions of the front end pulse and the back end pulse in the combinations (that is, the elements of the correction table) of (pre-code length 7 T-recording code length 3 T-post-code length 7 T), (pre-code length 7 T-recording code length 5 T-post-code length 7 T) and (pre-code length 3 T-recording code length 5 T-post-code length 6 T) is described in FIG. 5. Here, T represents the period of the channel clock. In FIG. 5, (a) is a channel clock signal, (b) is a waveform of the recording data signal 18, (c) is a waveform of the recording pulse signal 19 and (d) shows a waveform of the recording pulse signal 22 after pulse edge correction. (e) shows the state of the marks that are recorded according to the recording pulse signal, numeral 501 represents a track, and numeral 502 represents a recording mark.

During test recording, first of all, according to a seek operation step (step 401 in FIG. 4, abbreviated below as S401), the optical head 12 seeks out the control track region 302 on the optical disk 1, based on a command from the system control circuit 2. The identifier that represents the recording density of the optical disk 1 is recorded in the control track region 302. Information that indicates the recording power and initial values of the correction table of the optical disk 1 is also recorded in the control track region 302. In accordance with the information of the control track region 302, the system control circuit 2 records the initial values of the front end pulse edge position and the back end pulse edge position in the table registration memory 3. Furthermore, the system control circuit 2 sets these initial values in the recording pulse edge correction circuit 8. The system control circuit 2 also sets the recording power of the laser drive circuit 11 in advance.

Next, the disk information track is reproduced by an identifier reproduction step (S402), and the reproduction signal is transmitted to the identifier detection circuit 17 via the reproduction signal processing circuit 14 and the demodulation circuit 15. Then, the information of the identifier is detected by the identifier detection circuit 17, and is transmitted to the system control circuit 2. In the recording density decision step (S403), the system control circuit 2 decides the density at which the information should be recorded, and transmits a switching control signal 20 that depends on the recording density that was determined to the selection circuits 204 and 205 of the recording pulse edge correction circuit 8.

The results that were decided in the recording density decision step (S403) are described below, divided into the cases of the first to third recording densities.

Operation of Embodiment 1—The Case of the First Recording Density

If the result of the recording density decision step (S403) is the first recording density (that is, the recording density is the highest), then the selecting circuits 204 and 205 are switched by a selection circuit switching step (S404) to the first delay amount setting circuits 206 and 208. Accordingly, a state is assumed in which the edge positions of the recording pulses can be set in response to a combination of the pre-code length and the recording code length, and a combination of the recording code length and the post-code length.

The operation of the selection circuit switching step (S404) is described in detail using FIG. 2. The selection circuit 204 is switched so as to input the recording data signal 18, which comes from the demodulation circuit 5, into the first delay amount setting circuits 206 and 208. The delay amount setting circuits 206 and 208 compare a table setting signal 21 that comes from the table registration memory 3, the combination of the pre-code length and the recording code length, and the combination of the recording code length and the post-code length, and set the correction amount of the recording pulse edge in the delay circuits 210 and 211. The delay circuit 210 adjusts the forward edge of the front pulse, and the delay circuit 211 corrects the edge position by adjustment of the rear edge of the back end pulse.

In this case, the structure of the correction table in the table registration memory 3 is as shown in Table 1 and Table 2.

TABLE 1

Forward edge correction amount

| | | Recording code length | | | |
|---|---|---|---|---|---|
| | | 3T | 4T | 5T | 6T and greater |
| Pre-code length | 3T | Δ (3, 3) F | Δ (3, 4) F | Δ (3, 5) F | Δ (3, 6) F |
| | 4T | Δ (4, 3) F | Δ (4, 4) F | Δ (4, 5) F | Δ (4, 6) F |
| | 5T | Δ (5, 3) F | Δ (5, 4) F | Δ (5, 5) F | Δ (5, 6) F |
| | 6T and greater | Δ (6, 3) F | Δ (6, 4) F | Δ (6, 5) F | Δ (6, 6) F |

TABLE 2

Forward edge correction amount

| | | Recording code length | | | |
|---|---|---|---|---|---|
| | | 3T | 4T | 5T | 6T and greater |
| Post-code length | 3T | Δ (3, 3) L | Δ (4, 3) L | Δ (5, 3) L | Δ (6, 3) L |
| | 4T | Δ (3, 4) L | Δ (4, 4) L | Δ (5, 4) L | Δ (6, 4) L |
| | 5T | Δ (3, 5) L | Δ (4, 5) L | Δ (5, 5) L | Δ (6, 5) L |
| | 6T and greater | Δ (3, 6) L | Δ (4, 6) L | Δ (5, 6) L | Δ (6, 6) L |

These tables represent the correction amount of the front end edge position and the back end edge position when the shortest code length is 3 T, and the longest code length is 11 T.

Correction tables that use the same correction values for 6 T and above are recorded as information in the control track region of the optical disk used in the present embodiment. Consequently, from the combination of the code lengths, there are 32 elements in the correction tables.

A test recording and edge position determination subroutine (S405), is a step that determines the edge positions for the 32 table elements. The details are described in the steps S412 to S416. That is to say that in a test pattern switching step (S412), a control signal is transmitted from the system control circuit 2 such that a test pattern for determining the correction amount of a predetermined table element can be transmitted from the test pattern signal generation circuit 4.

By a test pattern recording operation step (S413), the recording pulse generation circuit 6 converts the recording data signal 18 (corresponding to (b) in FIG. 5) transmitted from the test pattern signal generation circuit 4 into the recording pulse signal 19 (corresponding to (c) in FIG. 5). This detects how many multiples of the channel clock period T the signal inverted interval of the recording data signal 18 corresponds to, and generates a recording pulse sequence of a predetermined number and a predetermined width at a predetermined timing, which depends on the recording code length.

And, in the recording pulse edge correction circuit 8, the front end pulse edge position and the back end pulse edge position of the recording pulse sequence are adjusted to the set values. That is to say, as shown in (d) of FIG. 5, the leading edge of the front end pulse of (pre-code length 7 T-recording code length 3 T) is adjusted by $\Delta_{(6, 3)F}$, the trailing edge of the back end pulse of (recording code length 3 T-post-code length 7 T) is adjusted by $\alpha_{(3, 6)L}$, the leading edge of the front end pulse of (pre-code length 7 T-recording code length 5 T) is adjusted by $\Delta_{(3, 5)F}$, ... and thus, the pulse edges are adjusted in accordance with the values of the elements of the correction tables of Table 1 and Table 2.

The laser drive circuit 11 carries out test recording on the track in the test region 303 by modulating the driving current of the laser according to the recording pulse signal that passed through the recording pulse edge correction circuit 8, as shown in (d) of FIG. 5. As shown in (e) of FIG. 5, after recording, the edges of the recording mark 502 are formed on the track 501 at normalized positions that correspond to integer multiples of the channel clock.

After the test pattern signal is recorded, the track is reproduced by the optical head 12 in a reproduction operation step (S414). The reproduction signal circuit 14 carries out equalization of the waveform, and binary conversion of the reproduction signal. And, the reproduction signal waveform measurement circuit 16 slices the binary signal, and measures the reproduction signal inverted interval by a signal timing measurement step (S415). An edge position determination step (S416) requests the difference between the reproduction signal inverted interval and the signal inverted interval of the test pattern signal (that is, the offset amount of the edge mark), and fixes the amount that compensates that difference as the correction amount in that table element. It should be noted that the steps S413 to S416, which change the correction amount, can be performed repeatedly until the difference between the reproduction signal inverted interval and the signal inverted interval of the test pattern signal is a minimum.

The system signal circuit 2 registers the edge position that is being set in the table registration memory 3 in the system control circuit 2 as edge position information, and concludes the test recording with respect to this combination table element. Moreover, in a table element determination step (S406), the system control circuit 2 determines whether S405 has been repeated or not for all the elements of the combination table, and completes the setting and registration of the edge position of all 32 table elements shown in Table 1 and Table 2, after which it completes the test recording and starts recording the actual information signal.

Operation of Embodiment 1—The Case of the Second Recording Density

On the other hand, when the determination result is the second recording density (that is, lower than the first recording density), the operation is as described below. By a switching selection circuit step (S408), the selection circuit 204 switches so as to input the recording data signal 18 that comes from the modulation circuit 5 into second delay amount setting circuits 207 and 209. Thus, the selection circuit 204 is in a condition to set the edge position of the recording pulse, with consideration only to the recording code length.

In the second delay amount setting circuits 207 and 209, the table setting signal 21 from the table registration memory 3 is compared to the recording code length, and the correction amount of the recording pulse edge is set for the delay circuits 210 and 211. Similarly as in the case of the first recording density, the edge position is corrected in the delay circuits 211 and 212 by adjusting, respectively, the leading edge of the front pulse, and the trailing edge of the rear pulse.

In this case, the structure of the correction table in the table registration memory 3 is as given in Table 3 and Table 4. From the combination of code lengths, the number of elements in the correction table is 8.

TABLE 3

| Recording code length | Forward edge correction amount |
|---|---|
| 3T | Δ 3F |
| 4T | Δ 4F |
| 5T | Δ 5F |
| 6T and greater | Δ 6F |

TABLE 4

| Recording code length | Forward edge correction amount |
|---|---|
| 3T | Δ 3F |
| 4T | Δ 4F |
| 5T | Δ 5F |
| 6T and greater | Δ 6F |

Furthermore, FIG. 6 is a waveform showing the operation of recording the disk at the second recording density, according to the present embodiment. FIG. 6 shows recording of the same recording data signal as in FIG. 5, however the operation to correct the edge position of the recording pulse is different. That is to say, correction of the edge position is performed with respect to a recording code length of 3 T and a recording code length of 5 T.

The test recording and edge position determination subroutine (S405) is the step in which the edge position is determined with respect to the 8 table elements, and is similar to that of the step for high density recording described above. It differs in that in the second recording pulse edge correction circuit 9, the front end pulse edge position and the back end pulse edge position of the recording pulse sequence are adjusted to set values. That is to say, as shown by (d) in FIG. 5, the leading edge of the front end pulse of the recording code length 3 T is adjusted by Δ3F, the trailing edge of the back end pulse of the recording code length 3 T is adjusted by Δ3 L, the leading edge of the front end pulse of the recording code length 5 T is adjusted by Δ5F, . . . and thus, the pulse edge is adjusted according to the values of the elements of the correction tables of Table 3 and Table 4. Consequently, a table element determination step (S409) determines whether or not setting and registration of the edge position of the eight table elements shown in Table 3 and Table 4 is complete.

Operation of Embodiment 1—The Case of the Third Recording Density

Moreover, when the determination result is the third recording density (that is, lower than the second recording density), the selection circuits 204 and 205 transmit the signals to the direct delay circuits 210 and 211 respectively, without carrying out the test recording.

FIG. 7 is a waveform showing the operation in the case of the third recording density. FIG. 7 shows the recording of the same recording data signal as in FIG. 5 and FIG. 6, however it differs in the correction of the edge position of the recording pulse. The waveforms of (c) and (d) in FIG. 7 are the same, and there is no adjustment step of the edge position of the recording pulse.

The method as described above is used for the following reasons. The effect of thermal interference between recording marks that are adjacent in the tracking direction when the disk is recorded at the second recording density is less than when recorded at the first recording density, so fluctuations in the edge position of the recording marks caused by differences in the pre-code length or differences in the post-code length are small enough to ignore. Consequently, the recording pulse edges are corrected only with respect to the recording code length, and sufficient reproduction signal quality can be obtained even using the correction table containing eight elements. Moreover, with the third recording density, fluctuations of the edge position of the recording mark caused by differences in the recording code length are small enough to ignore. Consequently, sufficient reproduction signal quality can be obtained even without adjusting the edge position of the recording pulse with respect to the recording code length, the pre-code length and the post-code length.

Accordingly, there are no unnecessary test recording steps when recording low density disks. Thus, it is possible to reduce the time taken for test recording.

Comparative Experiment of Embodiment 1

The following is an explanation in order to confirm the effect of Embodiment 1, a comparative experiment (working example) in which the recording density is differentiated. A polycarbonate resin having a diameter of 120 mm and a thickness of 0.6 mm is used as the substrate of the optical disk 1. Unevenly-shaped phase pits are pre-formatted in advance as a control track region on this substrate. Information that represents the recording density of the disk is recorded as an identifier in the control track region.

In order to handle recording and reproduction at different recording densities, an identifier that represents two different types of recording density is recorded on the optical disk 1. Here, information showing that the disk is capable of being recorded and reproduced at two recording densities, namely at a first recording density with a minimum mark length of 0.35 μm and a second recording density with a minimum mark length of 0.55 μm, is recorded.

A guide groove is formed in a sector of the data region of the resin substrate. Furthermore, phase pits that represent address information are formed between the sectors. The pitch of the guide grooves is 1.4 μm. A protective film, a recording film, a protective film and a reflective film are four layers that are film formed on the substrate by sputtering, and a protective substrate is bonded onto that. ZnS—SiO$_2$ is used as the protective film, GeSbTe is used as the recording film, and Al is used as the reflective film.

The disk 1 is rotated at a linear velocity of 8.2 m/s by the spindle motor 13, and laser light of wavelength 650 nm is focused by an objective lens whose numerical aperture (NA) is 0.6.

The power of the laser light for recording and reproduction is Pp=10.5 mW, Pb=4 mW and Pr=1 mW. The modulation process of the recording information uses (8-16) pulse width modulations The frequency of the channel clock was changed to handle the recording density.

For comparison, the case in which the number of elements in the correction table is 32 is shown in Table 1 and Table 2, and the case when the number of elements is eight is shown in Table 3 or Table 4. The correction resolution of the elements is 0.5 ns. It should be noted that correction resolution means the minimum unit of increase or decrease of the correction amount. Specific examples of the correction tables Table 1 to Table 4 according to this condition, for the case in which the minimum mark length is 0.55 μm, are shown in Table 5 to Table 8, and for the case in which the minimum mark length is 0.35 μm, are shown in Table 9 to Table 12.

TABLE 5

| | | Forward edge correction amount (ns) | | | |
|---|---|---|---|---|---|
| | | Recording code length | | | |
| | | 3T | 4T | 5T | 6T and greater |
| Pre-code length | 3T | −3 | −1 | −1 | −1 |
| | 4T | −3 | −1 | −1 | −1 |
| | 5T | −2 | −1 | −1 | 0 |
| | 6T and greater | −2 | −1 | −1 | 0 |

TABLE 6

| | | Forward edge correction amount (ns) | | | |
|---|---|---|---|---|---|
| | | Recording code length | | | |
| | | 3T | 4T | 5T | 6T and greater |
| Post-code length | 3T | 0 | 2 | 2 | 3 |
| | 4T | 0 | 2 | 2 | 3 |
| | 5T | 1 | 2 | 2 | 3 |
| | 6T and greater | 1 | 2 | 3 | 3 |

TABLE 7

| Recording code length | Forward edge correction amount (ns) |
|---|---|
| 3T | −2 |
| 4T | −1 |
| 5T | −1 |
| 6T and greater | 0 |

TABLE 8

| Recording code length | Forward edge correction amount (ns) |
|---|---|
| 3T | 1 |
| 4T | 2 |
| 5T | 3 |
| 6T and greater | 3 |

TABLE 9

| | | Forward edge correction amount (ns) | | | |
|---|---|---|---|---|---|
| | | Recording code length | | | |
| | | 3T | 4T | 5T | 6T and greater |
| Pre-code length | 3T | −5 | −3 | −2 | −2 |
| | 4T | −4 | −2 | −2 | −2 |
| | 5T | −3 | −2 | −1 | −1 |
| | 6T and greater | −2 | −1 | −1 | 0 |

TABLE 10

| | | Forward edge correction amount (ns) | | | |
|---|---|---|---|---|---|
| | | Recording code length | | | |
| | | 3T | 4T | 5T | 6T and greater |
| Post-code length | 3T | −1 | 1 | 1 | 2 |
| | 4T | 0 | 1 | 2 | 2 |

TABLE 10-continued

Forward edge correction amount (ns)

| | Recording code length | | | |
|---|---|---|---|---|
| | 3T | 4T | 5T | 6T and greater |
| 5T | 0 | 2 | 2 | 3 |
| 6T and greater | 1 | 2 | 3 | 3 |

TABLE 11

| Recording code length | Forward edge correction amount (ns) |
|---|---|
| 3T | −3 |
| 4T | −2 |
| 5T | −1 |
| 6T and greater | −1 |

TABLE 12

| Recording code length | Forward edge correction amount (ns) |
|---|---|
| 3T | 0 |
| 4T | 2 |
| 5T | 2 |
| 6T and greater | 3 |

Test recording was performed using the conditions described above, after which a random signal was recorded 10 times, and reproduction signal jitter was measured by a time interval analyzer. The results of measuring the jitter for each information layer and correction table element number are shown in Table 13.

TABLE 13

| | | Number of elements | |
|---|---|---|---|
| | | 8 | 32 |
| Minimum mark length | 0.35 μm | 11.0% | 8.9% |
| | 0.55 μm | 6.8% | 6.5% |

From Table 13, when the minimum mark length is 0.55 μm, either 8 elements or 32 elements give a jitter in the 6% range. As opposed to this, when the minimum mark length is 0.35 μm, 32 elements give a jitter in the 8% range, however it is found that in the case of eight elements, jitter deteriorates to 11.0%. This is because when the minimum mark length is 0.35 μm, the space between the recording marks is shorter and the period of the channel clock also decreases. Consequently, since changes in thermal interference with respect to changes in the pre-code length and the post-code length are relatively large, it appears that the desired jitter is unobtainable without using the correction table arranged by combining the pre-code lengths or post-code lengths with the recording code length. Consequently, when the minimum mark length is 0.55 μm, from the stand point of reducing the test recording time, it is preferable to switch so that the number of elements in the correction table is 8, and from the stand point of obtaining a favorable jitter value, it is preferable that the number of elements in the correction table is switched to 32 when the minimum mark length is 0.35 μm.

Thus, in the present embodiment, since the number of elements in the table is reduced and the test recording is performed when recording at a low recording density according to the identification result of the identifier of the disk, it is possible to achieve a special effect in that the amount of time required for test recording is reduced.

It should be noted that in the embodiment described above, the number of elements in the correction table also can be differentiated by the linear velocity at which the disk is recorded. For example, when recording is performed using the same channel clock frequency, the recording density is lower at the higher linear velocity, and since heat is less likely to accumulate on the recording film during recording, the edge position of the recording mark is less susceptible to the influence of thermal interference. Consequently, even without using the correction table that is combined from the pre-code length or the post-code length and the recording code length, a favorable jitter can be obtained. Thus, the number of elements in the correction table can be reduced, and it is possible to reduce the time that is required for the test recording.

Furthermore, in the embodiment described above, the correction accuracy was switched by actually changing the number of elements in the table, according to the identification result of the identifier, however the present embodiment can also have the structure in which the correction accuracy is changed by keeping the number of elements in the table as is, and setting the values of the predetermined table elements to be equivalent.

For example, in the tables of Table 1 and Table 2, by setting the values of the table elements equivalent such that:

$$\Delta_{(3,3)F}=\Delta_{(4,3)F}=\Delta_{(5,3)F}=\Delta_{(6,3)F}$$

$$\Delta_{(3,4)F}=\Delta_{(4,4)F}=\Delta_{(5,4)F}=\Delta_{(6,4)F}$$

...

$$\Delta_{(6,3)L}=\Delta_{(6,4)L}=\Delta_{(6,5)L}=\Delta_{(6,6)F}$$

then the same effect of the correction table of Table 3 and Table 4 can be obtained.

Furthermore, the adjustment step of the recording pulse edge position was not performed in the case of the third recording density in the operation of the embodiment described above, however it is also possible of uniformly adjust the recording pulse edge position without consideration to the code length. At this time, the correction table contains a total of two elements, as shown in Table 14 and Table 15. In this case, it is possible to obtain more favorable recording and reproduction characteristics at the third recording density.

TABLE 14

| Forward edge correction amount |
|---|
| ΔF |

TABLE 15

| Rear edge correction amount |
|---|
| ΔL |

Embodiment 2

Even in a structure other than that described in Embodiment 1, and even when the structure is such that the number of elements of the correction tables differs when there is a difference in the recording characteristics of the disk, it is possible to obtain a similar special effect. That is to say, even when the recording density is the same, if the disk itself has recording characteristics with low thermal interference, then even if the number of elements in the correction table is reduced, the fluctuations in the edge position of the recording mark are small enough to be ignored. Consequently, it is possible to reduce the time that is required for test recording.

An embodiment of an optical disk that has two recording layers is described below, as the most typical example of the case in which the recording characteristics differ, regarding an embodiment in which the number of elements of the correction table are made to differ to handle the information layers of multi-layer media.

Structure and Operation of Embodiment 2

Figure 8:
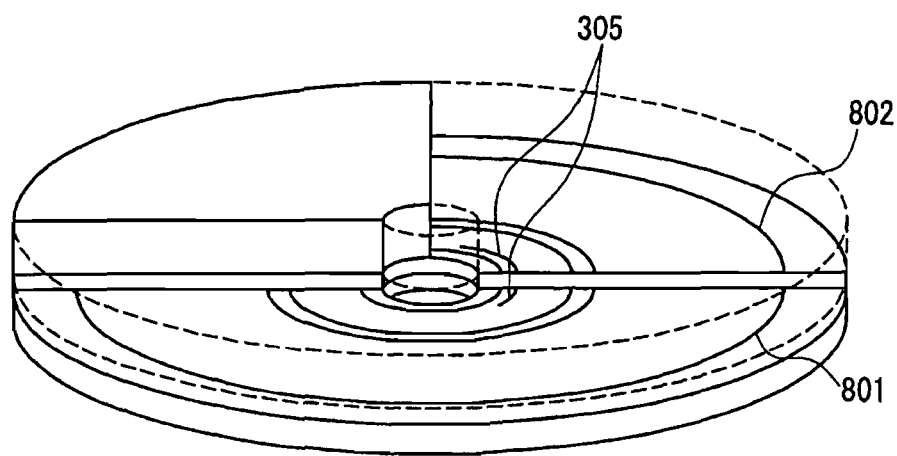
FIG. 8 is a perspective view showing a configuration of an optical information recording medium according to Embodiment 2.

FIG. 8 shows a perspective view of an optical disk 1 (optical information recording medium) that is used in the present embodiment. In order to describe an internal portion of the optical disk, FIG. 8 shows the optical disk 1 with one part cut out. The optical disk is viewed from the side on which the laser light for recording and reproducing the optical disk is incident, and is made of a first information layer 801, which is positioned at the front, and a second information layer 802, which is positioned at the back. An identifier 305 is present independently on the information layers, and an identifier that corresponds to the correction accuracy is recorded. Excluding the point that the identifier detection circuit detects the identifier on each information layer, the configuration and operation of the recording and reproduction apparatus of the present embodiment is the same as that of Embodiment 1.

Comparative Experiment of Embodiment 2

The comparative experiment (working example) of Embodiment 2 is described below. The optical disk is fabricated as given below. As the substrate, polycarbonate resin having a diameter of 120 mm and a thickness of 1.1 mm is used, and a spiral-shaped groove having a width of 0.25 μm, a pitch of 0.32 μm and a depth of 20 nm is formed on its upper surface. Furthermore, unevenly-shaped phase pits are preformatted in advance as a control track region on this substrate.

The second information layer 802 is formed on top of the surface of the substrate and is film formed in the order: reflective layer Ag alloy; dielectric layer ZnS—$SiO_2$; recording layer GeSblb; dielectric layer ZnS—$SiO_2$.

Next, a center layer, which transcribes a groove shape that is similar to that on the substrate, is formed. Moreover, an AlN dielectric layer, a ZnS—$SiO_2$ dielectric layer, a GeSbTe recording layer and a ZnS—$SiO_2$ dielectric layer are film formed in this sequence as the first information layer 801. No reflective layer is used with the front information layer so as to increase its transmittance.

Finally, a sheet made from polycarbonate is bonded by an ultraviolet hardening resin. The total thickness of the adhesive and the sheet is 0.1 mm.

Furthermore, in the control track region of the information layers, information that represents the correction accuracy of the information layers is recorded in the form of a phase pit structure as the identifier 305. The identifier information that is recorded differs between that of the front information layer and the back information layer.

The recording and reproduction experiment was performed using this disk. Rotating the disk at a linear velocity of 5 m/s, either of the information layers of the disk is irradiated by semiconductor laser light of wavelength of 405 nm that is stopped down through an objective lens, which has a numerical aperture (NA) of 0.85.

(8-16) modulation is used as the modulation code during recording and reproduction, and the signal after modulation is multi-pulse processed to cause the semiconductor laser to emit light. A mark length of 3 T was 0.20 μm.

For comparison, the case in which the number of elements in the correction table is 32 is shown in Table 1 and Table 2, and the case when the number is 8 is shown in Table 3 or Table 4. The correction resolution of the elements was 0.5 ns.

Test recording was performed under these conditions, after which a random signal was recorded 10 times, and the jitter of the reproduction signal measured by a time interval analyzer. The result of the jitter measurement with respect to the information layers and number of elements in the correction table is shown in Table 16.

TABLE 16

|  |  | Number of elements | |
|---|---|---|---|
|  |  | 8 | 32 |
| Information layer | Front | 9.8% | 8.7% |
|  | Back | 8.3% | 8.0% |

From Table 16, in the information layer at the back, a favorable jitter in the 8% range can be obtained using either the correction table that has 32 elements or eight elements. This is because there is no necessity for the back information layer of the multi-layer media to have a configuration that has a high transmittance, unlike in the front information layer in which it is necessary to ensure that the laser light reaches the back layer. Therefore, because optical absorption is high, it is possible to constitute a multi-layer film using a thick reflecting film of a high thermal conductivity, and the heat developed during recording tends to be dispersed easily from the recording film to the reflecting film. Consequently, since the effect of thermal interference in the tracking direction is small, and the change in thermal interference relative to the change in pre-code length or post-code length is small, it seems that the jitter does not change very much even using a table that corrects the edge position of the recording pulse only with respect to the recording code length. In this case, since the number of test recording process steps can be reduced when the number of elements is eight, it is favorable from the view point of shortening the time required for test recording.

On the other hand, although the jitter of the front information layer is in the 8% range when the number of elements is 32, it has been found that this deteriorates to 9.8% with only eight elements. Since the front information layer is not provided with a reflective layer that has high thermal conductivity, the heat developed during recording tends to be dispersed within the recording layer. Consequently, the change in thermal interference relative to the change in pre-code length and post-code length is large, so it seems that the desired jitter cannot be obtained without using a correction table that is a combination of pre-code length or post-code length and recording code length. In this case, it is preferable that the correction table has 32 elements from the stand point of obtaining a favorable jitter value.

In the present working example as described above, since the number of elements in the correction table is reduced before test recording according to the result of identifying the identifier that represents the information layer, it is possible to shorten the time that is required for test recording. It should be noted that the number of information layers is not limited to two, and the same result can be obtained with three or more layers, provided the number of elements is matched to the recording characteristics of the layers.

Furthermore, the present working example is not limited to multi-layer disks, and even with mono-layer disks, the number of elements can differ in accordance with differences in the recording characteristics of each disk.

Embodiment 3

The present embodiment is an embodiment in which a disk whose recording conditions are identified by reproducing an identifier on the disk, and whose recording characteristics when, for example, the linear velocity of recording onto the disk is low, are such that even if the edge of the recording pulse is greatly changed then the effect on the edge position of the recording mark is small, and there are no unnecessary test recording steps to pass through by reducing the resolution of the elements of the correction table to record.

Configuration and Operation of the Embodiment 3

Figure 9:
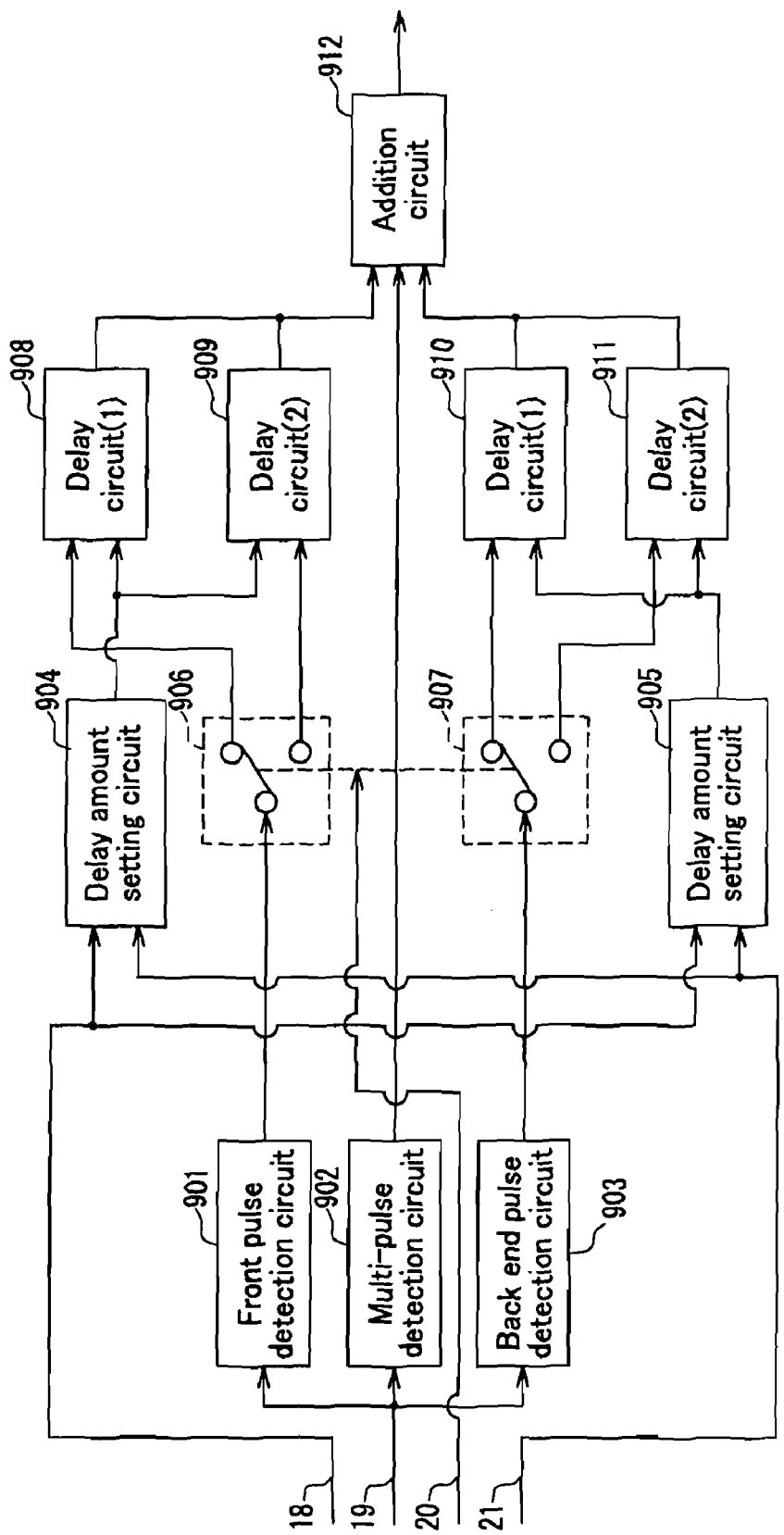
FIG. 9 is a block diagram showing a configuration of a recording pulse edge correction portion according to Embodiment 3 of the present invention.
Figure 10:
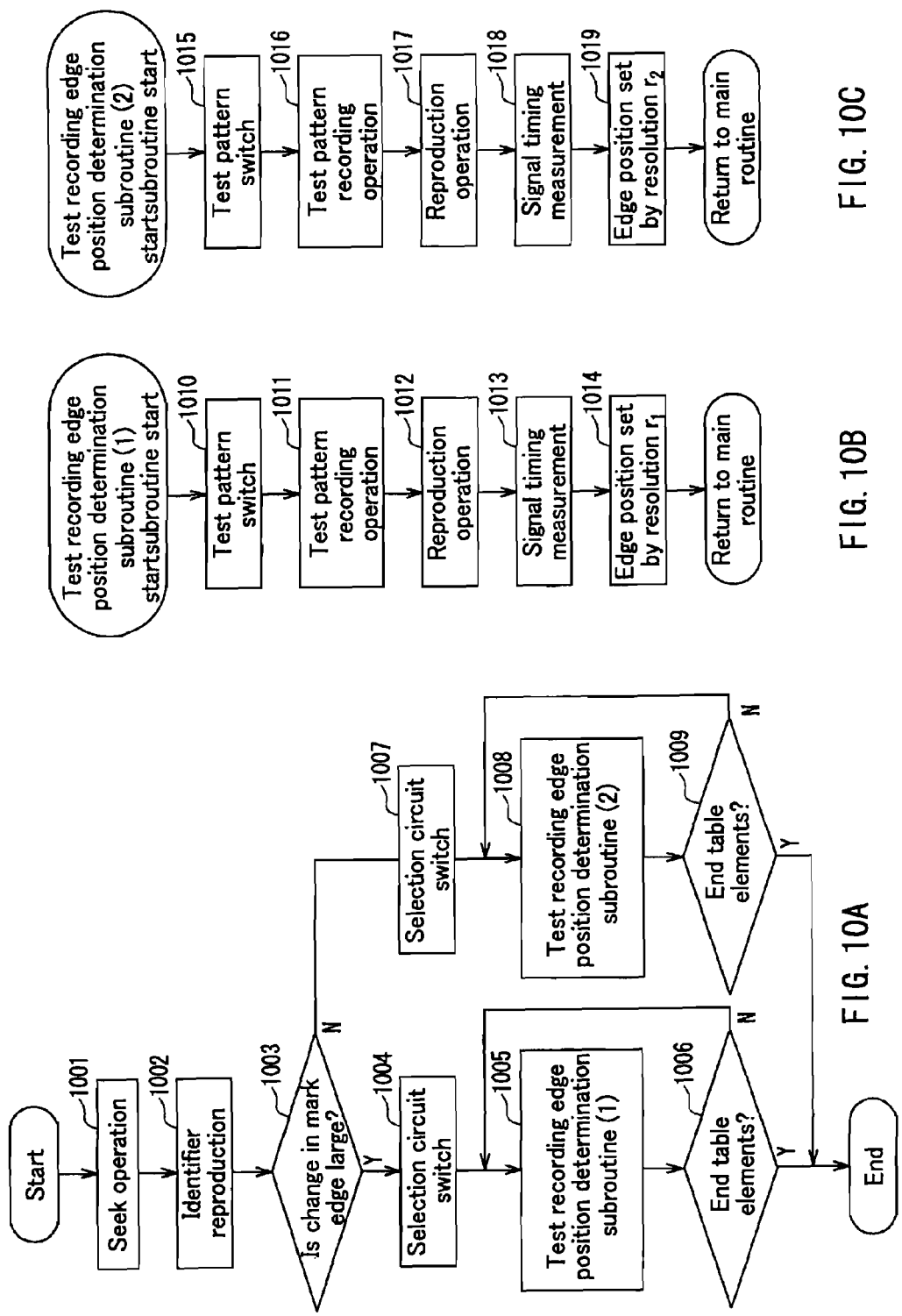
FIG. 10 is a flowchart that describes the operation of a recording and reproduction apparatus according to Embodiment 3.
Figure 11:
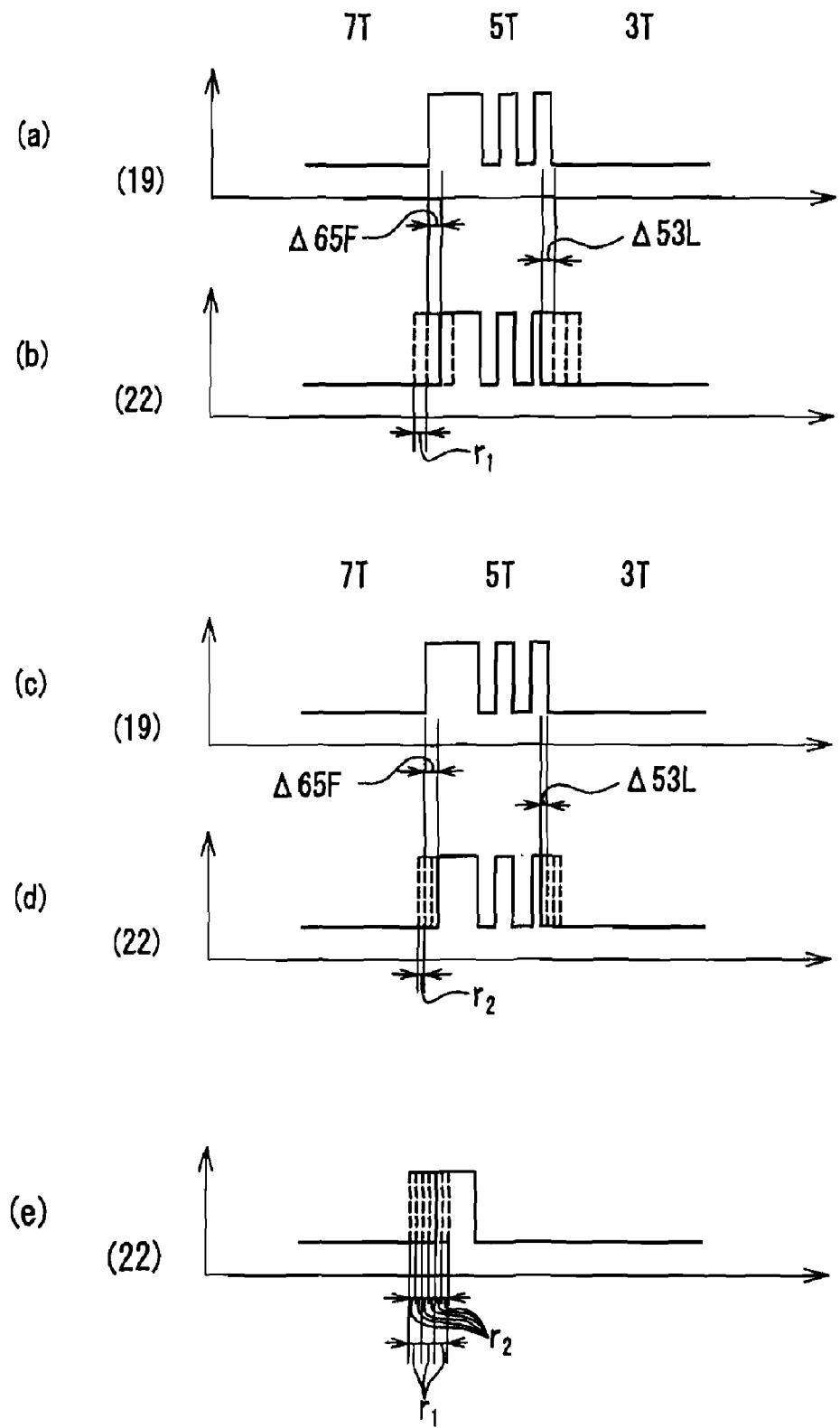
FIG. 11 is an explanatory diagram showing an example in which a recording pulse edge position is corrected according to Embodiment 3.

A structural overview of the recording and reproduction apparatus (optical information recording apparatus) for realizing Embodiment 3 is the same as that in FIG. 1. FIG. 9 is a diagram showing the detailed configuration of the recording pulse edge correction circuit 8 in FIG. 1. FIG. 10 is a flowchart used to describe the operation of the present embodiment, and FIG. 11 is a waveform diagram of the recording pulse signal that describes the present embodiment.

The configuration of FIG. 9 differs from Embodiment 1 in that the destination of the transmission of the front pulse signal from a front pulse detection circuit 901 is switched between either a first delay circuit 908 or a second delay circuit 909 by a selection circuit 906. Furthermore, the destination of the transmission of the back end pulse signal from a back end pulse detection circuit 903 is switched between either a first delay circuit 910 or a second delay circuit 911 by a selection circuit 907. Accordingly, the number of elements in the tables is the same, but the operation is realized by switching the set resolution of the elements in the correction table based on the disk recording characteristics. The operation is described in greater detail using FIG. 10 and FIG. 11.

The recording operation in FIG. 10 is as described below. The recording data signal 18 from the modulation circuit is transmitted to delay amount setting circuits 904 and 905. Pulse signals from the front pulse detection circuit 901 and back end pulse detection circuit 903 are transmitted to the selection circuits 906 and 907 respectively. In the delay setting circuits 904 and 905, the table setting signal 21 that comes from the table registration memory 3 is compared to a combination of the pre-code length and the post-code length, or a combination of the recording code length and the post-code length, so as to set the correction amount of the recording pulse edge for the first delay circuits 908 and 910 and the second delay circuits 909 and 911. In the delay circuits 908 to 911, the edge position is corrected by adjusting the relevant recording pulse edges. At this time, for the structure of the correction table in the table registration memory 3 as shown in Table 1 and Table 2, the table has the same number of components whichever selection is made by the selection circuits.

The operation of the first delay circuits 908 and 910 differs from that of the second delay circuits 909 and 911 in the set resolution of the delay amount. FIGS. 11(a) and (b) show an example of an adjustment of the recording pulse edge by the first delay circuits 908 and 910, and FIGS. 11(c) and (d) show an example of an adjustment of the recording pulse edge by the second delay circuits 909 and 911. Whereas the set resolution (minimum setting unit) of the delay circuit in the first delay circuit is $r_1$, that of the second delay circuit is $r_2$, and this is characterized by being smaller than that of the first delay circuit.

Furthermore, an identifier that corresponds to the set resolution is recorded in the control track region of the optical disk 1. For example, based on the results of an examination by the manufacturer of the disk, information is recorded that shows a set resolution at which sufficiently favorable recording and reproduction characteristics can be obtained when the edge of the recording pulse is changed, according to the size of the effect on the edge position of the recording mark.

FIG. 10 shows a series of test recording operations. They differ from Embodiment 1 in the following points. In a decision step S1003, the set resolution at which the disk that is recorded can obtain favorable recording and reproduction characteristics is identified according to the reproduction result in an identifier reproduction step S1002. That is to say, in a disk that has recording characteristics whereby the edge position of the recording mark changes greatly when the edge of the recording pulse changes, there is an increase in the set resolution at which favorable recording and reproduction characteristics can be obtained.

In cases in which disks or recording conditions have recording characteristics in which the edge position of the recording marks change greatly, the selection circuits 906 and 907 are switched to the second delay circuits 909 and 911 in a selection step S1007, and the edge position of the recording pulse is adjusted and determined at the relatively fine setting resolution $r_2$ (corresponding to steps S1015 to S1019).

Conversely, in the case in which the change in the edge position of the recording mark of disks or recording conditions is small, the selection circuit 907 is switched to the first delay circuit 908 and 910 in the selection step S1004, and the edge position of the recording pulse is adjusted and determined at the relatively coarse setting resolution $r_1$ (corresponding to steps S1010 to S1014).

By this operation, on the disk, or in the condition in which the change in the edge position of the recording mark is small, even if the steps S1011 to S1014 are performed repeatedly while changing the correction amount until the difference in the reproduction signal inverted interval and the signal inverted interval of the test pattern signal is a minimum, since the setting resolution is coarse, the edge position of the recording pulse can be determined with a minimum of repetitions. Additionally, fluctuations of the edge position of the recording mark can be made small enough to ignore. Consequently, it is possible to shorten the time necessary for test recording.

Comparative Experiment of Embodiment 3

In order to confirm the effect of the present embodiment, a comparative experiment (working example) in which the linear velocity was changed is described next as the recording condition. The optical disk 1 is fabricated by the same method as in Embodiment 1.

Information that represents the linear velocity at which the disk is recorded is recorded as an identifier in the control track region. In order to handle recording and reproduction at different linear velocities, two types of identifiers, which represent different linear velocities, are recorded. Information that the disk is capable of recording and reproducing at linear velocities of 8.2 m/s and 12.3 m/s is recorded here.

The disk 1 is rotated by the spindle motor 13 at the two different linear velocities of 8.2 m/s and 12.3 m/s, and a laser light of wavelength 650 nm is focused on the disk by an objective lens whose numerical aperture is 0.6.

The power of the laser light is Pp=11 mW, Pb=4.5 mW and Pr=1 mW when recording and reproduction at the linear velocity of 8.2 m/s. When the linear velocity is 12.3 m/s, Pp=13 mW, Pb=5 mW and Pr=1 mW. The modulation process of the recording information used (8-16) pulse width modulation. By changing the channel clock to handle the linear velocities, the minimum mark length is 0.4 μm at either linear velocity.

This comparative experiment uses the correction table shown in Table 1 and Table 2. The same 32 element table is used with either of the two linear velocities.

For comparison, the correction resolution of the table elements was set at the two types, namely 0.5 ns and 1.0 nm with respect to the linear velocities. That is to say that the element values were set to only 0.5 ns or only 1.0 ns in a setting step.

Test recording was performed using the above conditions, after which a random signal was recorded 10 times, and the jitter of the reproduction signal measured by a time interval analyzer. The result of the jitter measurement with respect to the linear velocities and correction resolution is shown in Table 17.

TABLE 17

|  |  | Correction resolution | |
| --- | --- | --- | --- |
|  |  | 0.5 ns | 1.0 |
| Linear velocity | 8.2 m/s | 8.2% | 8.4% |
|  | 12.3 m/s | 8.6% | 10.3% |

From Table 17, a favorable jitter in the 8% range can be obtained at either resolution of 0.5 ns or 1.0 ns for the linear velocity of 8.2 m/s. Since the linear velocity is slow, it appears that changes in the edge position of the recording pulse have only a small effect on the mark edge position, and thus there is not a lot of change in jitter at either resolution. In this case, it is preferable from the stand point of reducing the time that is required for the test recording, because the number of adjustment points of the pulse edge can be reduced when test recording at the correction resolution of 1.0 ns.

On the other hand, at the linear velocity of 12.3 m/s, the jitter is in the 8% range when the correction resolution is 0.5 ns, however it is found that this deteriorates to 10.3% when at 1.0 ns. This is because the effect of the change of the edge position of the recording pulse is large when the linear velocity is fast, and it is felt that the jitter worsens because the setting step is too coarse at 1.0 ns. In this case, from the stand point of obtaining a favorable jitter value, it is preferable that the correction resolution is 0.5 ns.

Therefore, in recording conditions in which the change in the edge position of the recording mark is small, it is possible to say that by lowering the resolution based on the identification result of the identifier, test recording is effective for accurately recording and reproducing information in a short test recording time.

In this manner, since the test recording in the present embodiment is performed by lowering the resolution of the elements of the correction table, the time necessary for test recording can be shortened when recording under conditions in which changes in the edge position of the recording pulse have a small effect on the mark edge position.

That is to say, the present embodiment is one in which the correction resolution is changed by switching the delay circuits. However it is also possible to use the same delay circuits and change the resolution from $r_2$ to $r_1$ by culling the setting steps, as shown in the waveform (e) in FIG. 11.

Furthermore, in the present embodiment, the number of elements in the table is the same, without consideration of the identification result of the identification step, however it is also possible to change the number of elements depending on the recording density or recording characteristics of the disk. That is to say, it is also possible to use the combinations in the first or second embodiments.

Furthermore, in the case whereby recording conditions differ within the same disk, test recording can be performed at a minimum testing time corresponding to each recording condition, by recording a plurality of identifier information that represent a correction accuracy corresponding to the conditions. For example, as shown in Table 18, it is only necessary that the recording power, the number of table elements and the resolution that corresponds to a plurality of linear velocities are recorded onto the control track region.

TABLE 18

|  | Linear velocity | |
| --- | --- | --- |
|  | $v_1$ | $v_2$ |
| Recording power | $P_{p1}, P_{b1}$ | $P_{p2}, P_{b2}$ |
| Number of Table elements | $n_1$ | $n_2$ |
| Resolution | $r_1$ | $r_2$ |

Moreover, if recording at different conditions within the same disk, instead of recording the number of table elements and the resolution as values, then it is possible to use a media to record a plurality of correction tables themselves, which contain the number of table elements and resolution. In this case, there is no necessity to provide special identifiers that represent the number of elements or the resolution, and the information that is recorded in the control track region can be simplified. Furthermore, the test recording can be performed by changing the correction accuracy of the correction table directly from the result of the read out from the correction table on the medium, and thus it is possible to further shorten the time required for test recording and information can be accurately recorded and reproduced, without needing to read out the special identifiers that represent the number of elements or the resolution.

Furthermore, when recording a plurality of correction tables of differing correction accuracies that correspond to a plurality of different linear velocities onto the medium, it is also possible to provide a correction table for high recording densities, which has high accuracy. In this case, since the correction accuracy can be reduced before test recording according to the correction table of low correction accuracy, when at a low linear velocity at which the change in the edge position of the recording mark is small, it is effective in accurately recording and reproducing information in a short test recording time.

Similarly, when recording a plurality of correction tables of differing correction accuracies that correspond to a plurality of different linear velocities, it is also possible to provide a correction table that has high accuracy for high recording densities. In this case, at low recording densities, since the correction accuracy can be reduced before test recording according to the correction table of low correction accuracy, it is effective in accurately recording and reproducing information in a short test recording time, in a similar manner to that described above.

Embodiment 4

The present embodiment is an embodiment in which BER is measured by recording and reproducing a random pattern on the disk, whereby the number of elements in the correction table is increased and test recording performed only when BER is higher than a fixed value, and in which there is no unnecessary test recording step for disks whose recording density is low, or for disks whose thermal interference is small.

Configuration and Operation of the Embodiment 4

Figure 12:
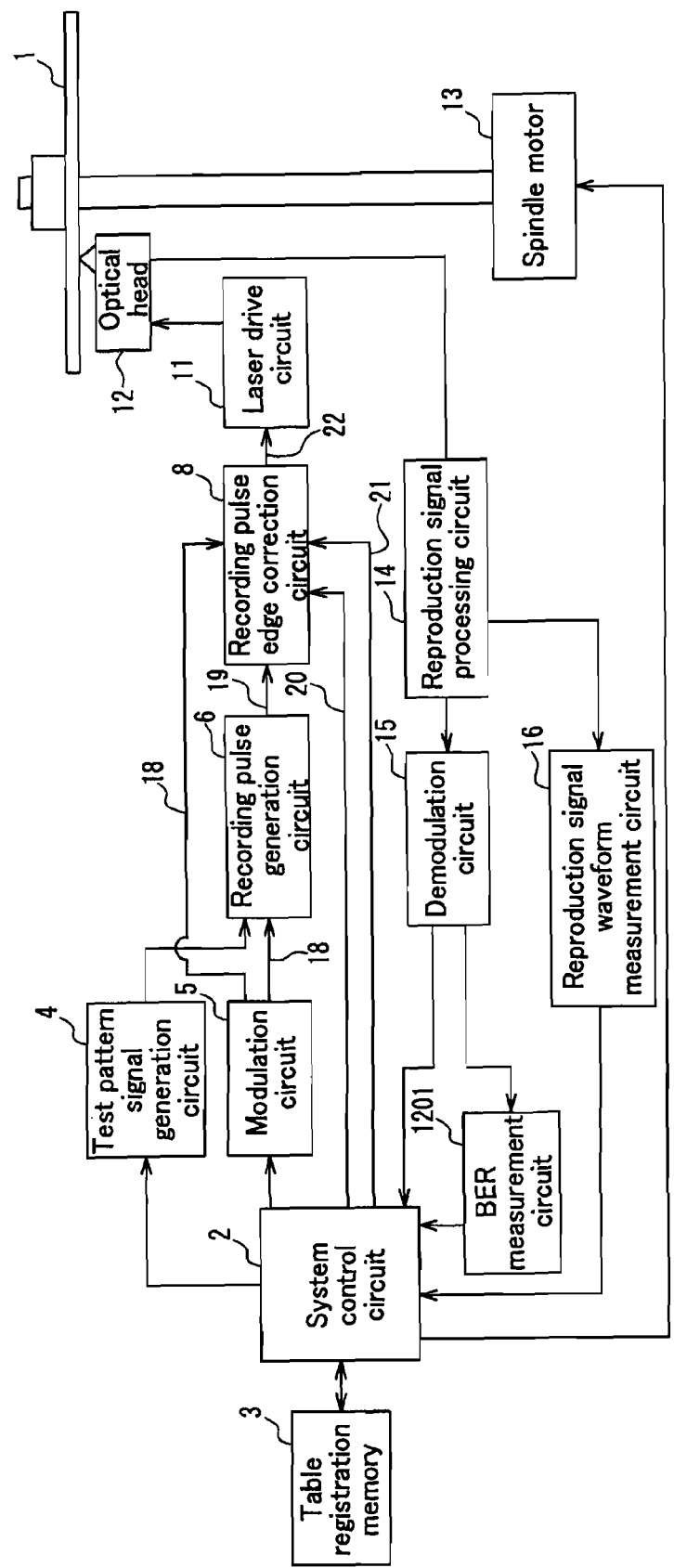
FIG. 12 is a block diagram showing a recording and reproduction apparatus according to Embodiment 4 of the present invention.

FIG. 12 is a block diagram showing a structural overview of a recording and reproduction apparatus (optical information recording apparatus) for realizing Embodiment 4. The configuration of the recording pulse edge correction circuit 8 in the present embodiment can be the same as that used in FIG. 2. FIG. 12 differs from the configuration of Embodiment 1 (FIG. 1) in the provision of a BER measurement circuit 1201 instead of the identifier detection circuit 17.

Figure 13:
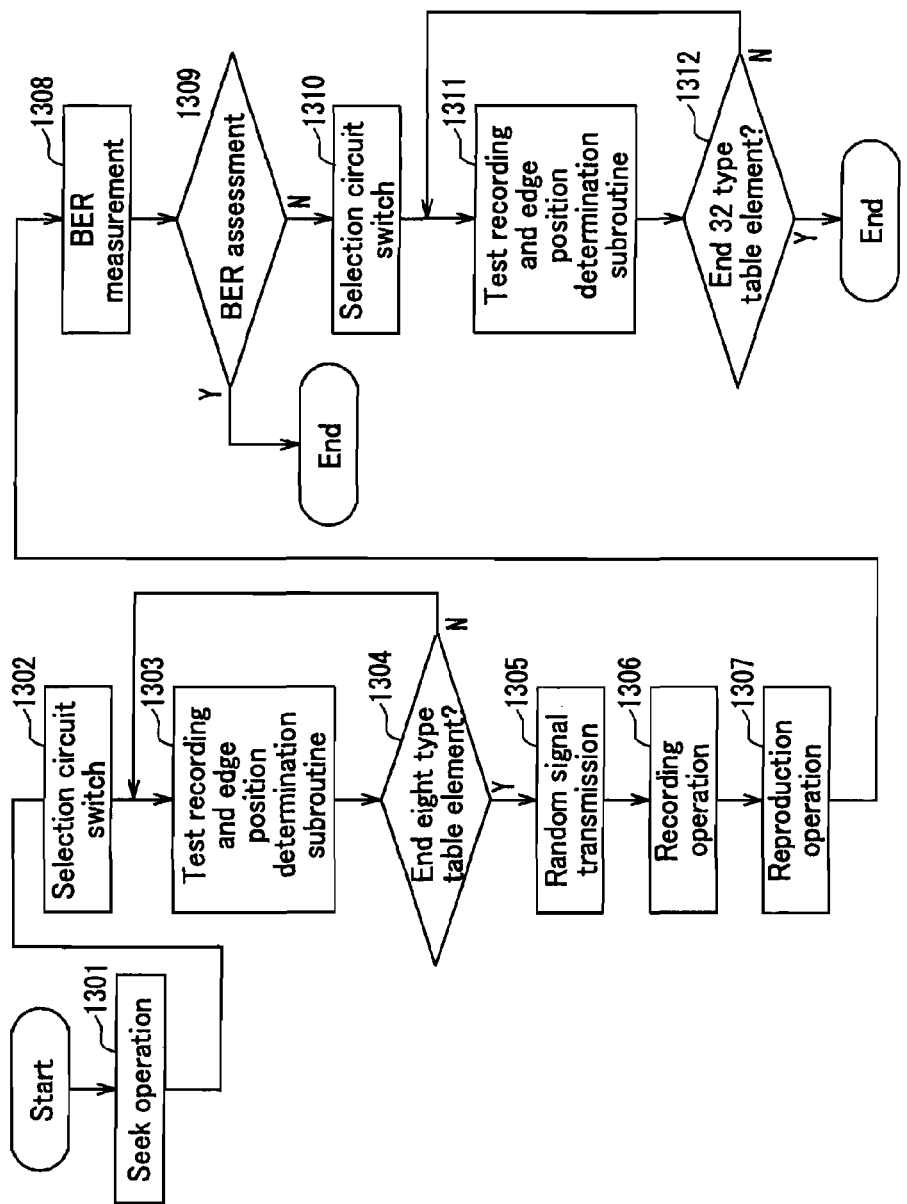
FIG. 13 is a flowchart describing the operation of the recording and reproduction apparatus according to Embodiment 4.

FIG. 13 is a flowchart that describes the operation of test recording in the present embodiment. The operation is described in more detail below using FIG. 12, FIG. 2 and FIG. 13.

After a seek operation (S1301) of the present embodiment, the selection circuits 204 and 205 are switched to the second delay amount setting circuits 207 and 209 by a selection circuit switching step S1302. Thus, the procedure is in a state in which the recording pulse edge position can be set according to the recording code length.

In this case, the structure of the correction table in the table registration memory 3 is as Table 3 and Table 4. From the combination of code lengths, the number of elements in the correction table is eight.

In a similar manner to Embodiment 1, test recording and measurement of the reproduction signal wave form is performed in order to determine the elements in the correction table (S1302 to S1303). After determining the values of the eight elements of the correction table, a random signal is transmitted from the test pattern signal generation circuit 4 and recording of the disk is performed (S1306). In addition to waveform equalization and binary conversion of the reproduction signal from the disk in the reproduction signal processing circuit 14, the information signal is demodulated (S1307) in the demodulation circuit 15. The demodulated information signal and the information signal of the random pattern that was generated in the test pattern signal generation circuit 4 are compared in the BER measurement circuit 1201, and the BER (bit error rate) of the reproduction signal is measured (S1308).

Then, the bit error rate and a BER prescribed value are compared in the system control circuit 2 by a BER assessment step, and the result of the assessment is obtained. Here, the BER prescribed value indicates a value at which the bit error rate of the information that is reproduced is capable of use. This value is fixed with consideration given to the recording margin of the recording and reproduction apparatus and the optical disk.

If the measured value is less than the standard value, then the test recording ends. Thus, with disks whose recording density is low, or with disks whose thermal interference is small, if fluctuation of the edge position of the recording mark caused by differences in the pre-code length or by differences in the post-code length is small enough to ignore, then it is not necessary to pass through an unnecessary test recording step. Therefore, it is possible to reduce the time taken for test recording even when using disks that have no identifier.

If the bit error rate that was measured is higher than the BER standard value, then the procedure passes through the following steps. The selection circuits 204 and 205 are switched to the first delay amount setting circuits 206 and 208 by a selection circuit switching step S1310. By this, the procedure is in a state in which it can set the edge position of the recording pulse depending on the combination of the pre-code length and the recording code length, and the combination of the recording code length and the post-code length.

In this case, the structure of the correction table in the table registration memory 3 is as given in Table 1 and Table 2. From the combination of the code lengths, the number of elements in the correction table is 32.

Similarly to Embodiment 1, test recording and measurement of the reproduction signal waveform are performed in order to determine the elements of the correction table. The test recording ends after determining the correction values of all the table elements.

In this manner, in the present embodiment, recording the random pattern signal after the test recording with fewer table elements, the test recording is repeated with a greater number of table elements only when the BER of the reproduction signal is higher than the fixed value, and thus the procedure does not pass through unnecessary test recording steps when using disks whose BER recording density is low, or disks whose thermal interference is small. Due to this, it is possible to shorten the time required for test recording even when the disk has no identifier.

It should be noted that in the present embodiment, the decision to end the procedure was based on the size of the BER value. However it is also possible to use the jitter value instead.

Furthermore, in the present embodiment, the number of elements were increased to perform the test recording only when the BER was higher than a fixed value, however a similar effect can also be obtained even in a method in which the number of elements are decreased to perform the test recording only when the BER is lower than a fixed value. That is, the test recording time is shortened. Furthermore, in the present embodiment, the number of elements in the correction table were changed, however a similar effect can also be obtained using a structure in which the resolution of the elements is changed. Moreover, a combination of changes to the number of elements and changes in the resolution is also possible.

Furthermore, the number of elements used in the correction tables of the Embodiment 1 to Embodiment 4 is independent of the code lengths, however since the effect of thermal interference decreases with longer code lengths, it is also possible to use a same number of elements for code lengths over a certain length (for example 6 T or more).

Furthermore, in the foregoing embodiments, the front edge position of the front end pulse and the rear edge position of the back end pulse were changed in the recording pulse edge correction circuit (in these cases, the width of the front end pulse and the width of the back end pulse change respectively), however it is also possible that the circuit adjusts the edge position by changing the actual position of the front end pulse and the back end pulse. Furthermore, it is also possible to have a circuit that switches between the method for changing the actual position of the front end pulse and the back end pulse, and the method for changing the edge position, depending on the disk recording characteristics and recording density.

Furthermore, in the foregoing embodiments, the correction accuracy was changed according to the number of elements in the correction table, or the value of the resolution of the correction table, however it is possible to use any other variable as long as it is a variable that affects the accuracy of the edge position of the recording pulse, such as a delay amount error of the delay circuit.

Furthermore, in the foregoing embodiments, the information that represents the correction accuracy was recorded on the medium as an identifier, however it is also possible to record onto that medium the actual correction table itself that contains the correction accuracy necessary for that medium. In this case, since the test recording is performed by changing the correction accuracy of the correction table directly from the result of the read-out of the correction table on the medium, the time required for test recording can be shortened further, and information can be recorded and reproduced accurately.

Moreover, provided the optical disk is a medium in which the optical characteristics of the recording mark and non-mark portion are different, such as a phase change material, photomagnetic material or pigment material, then any of the methods described above can be applied.

Furthermore, in the foregoing embodiments, recording has been illustrated using the mark edge recording method, however the present invention also can be applied to the recording by the mark position recording method.

Furthermore, such items as the modulation method, pulse lengths and period of the test pattern signal are not limited to those shown in the foregoing embodiments, and it goes without saying that it is possible to set appropriate values depending on the recording conditions and medium.

INDUSTRIAL APPLICABILITY

As described above, according to the present invention, since the correction accuracy of the recording pulse position is changed depending on an information recording condition or an information recording characteristic of an optical information recording medium, when recording information on recording media whose information recording conditions or information recording characteristics differs, it is possible to provide an optical information recording method and apparatus that can effectively determine appropriate recording parameters in a short time and which are capable of accurately recording and reproducing information.

What is claimed is:

1. An optical information recording method for recording information onto an optical information medium, the method comprising:

a recording pulse correction step of correcting at least one of elements to be corrected by each resolution, which is a minimum unit of increase or decrease of a correction amount, in order to form a recording mark in a predetermined position;

wherein in the recording pulse correction step, the resolution is differentiated according to a recording linear velocity, and the correction is performed with a correction amount, which is a total amount of at least one minimum unit corresponding to the differentiated resolution, and wherein the information recording is performed at a first recording linear velocity and a second recording linear velocity that is higher than the first recording linear velocity, and in the recording pulse correction step, a first resolution which is the resolution when recording at the first recording linear velocity, is larger than a second resolution, which is the resolution when recording at the second recording linear velocity.

2. An optical information recording apparatus that records information onto an optical information recording medium, the apparatus comprising:

a recording pulse correction means for correcting at least one of elements to be corrected by each resolution, which is a minimum unit of increase or decrease of a correction amount, in order to form a recording mark in a predetermined position;

wherein the recording pulse correction means differentiates the resolution according to a recording linear velocity, and the correction is performed with a correction amount, which is a total amount of at least one minimum unit corresponding to the differentiated resolution, and wherein the apparatus performs recording at a first recording linear velocity and a second recording linear velocity that is higher than the first recording linear velocity, and the recording pulse correction means sets a first resolution, which is the resolution when recording at the first recording linear velocity, to be larger than a second resolution, which is the resolution when recording at the second recording linear velocity.

3. An information recording medium onto which data are recorded by recording a mark by the optical information recording method according to claim 1.

4. A reproduction method comprising:

reproducing data by reading a mark recorded on a recording medium by the optical information recording method according to claim 1.

* * * * *